United States Patent
Iwai

(10) Patent No.: US 10,264,620 B2
(45) Date of Patent: *Apr. 16, 2019

(54) POLICY DETERMINATION SYSTEM, POLICY DETERMINATION METHOD, AND NON-TRANSITORY COMPUTER-READABLE MEDIUM

(71) Applicant: NEC CORPORATION, Tokyo (JP)

(72) Inventor: Takanori Iwai, Minato-ku (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/865,718

(22) Filed: Jan. 9, 2018

(65) Prior Publication Data

US 2018/0132302 A1     May 10, 2018

Related U.S. Application Data

(63) Continuation of application No. 13/996,511, filed as application No. PCT/JP2011/006474 on Nov. 21, 2011, now Pat. No. 9,907,109.

(30) Foreign Application Priority Data

Jan. 6, 2011    (JP) ................................ 2011-000991

(51) Int. Cl.
    *H04W 76/20*      (2018.01)
    *H04W 76/22*      (2018.01)
    *H04W 76/27*      (2018.01)

(52) U.S. Cl.
    CPC ........... *H04W 76/20* (2018.02); *H04W 76/22* (2018.02); *H04W 76/27* (2018.02)

(58) Field of Classification Search
    CPC ............................. H04W 76/20; H04W 76/22
    See application file for complete search history.

(56) References Cited

U.S. PATENT DOCUMENTS

| | | | |
|---|---|---|---|
| 8,958,389 | B2 | 2/2015 | Vikberg |
| 2005/0009515 | A1* | 1/2005 | Inoko ...................... H04L 47/72 455/426.2 |

(Continued)

FOREIGN PATENT DOCUMENTS

| | | |
|---|---|---|
| CN | 101374116 A | 2/2009 |
| EP | 1798998 A1 | 6/2007 |

(Continued)

OTHER PUBLICATIONS

Communication dated Aug. 5, 2015 from the State Intellectual Property Office of the People's Republic of China issued in Chinese application No. 201180064360.2.

(Continued)

*Primary Examiner* — Charles C Jiang
*Assistant Examiner* — Kyaw Z Soe
(74) *Attorney, Agent, or Firm* — Sughrue Mion, PLLC

(57) ABSTRACT

A policy determination system (500) according to an aspect of the present invention is arranged in a core network (10) and capable of communicating with a control apparatus (100) arranged in a radio access network (20). The control apparatus (100) is configured to perform control related to a state transition between a CONNECTED state and an IDLE state of a mobile terminal (300) based on a state control policy supplied from the policy determination system. The policy determination system (500) includes a policy determination unit (502) that determines a state control policy according to a situation of the mobile terminal (300), and a notification unit (503 or 205) that notifies the control apparatus (100) of the state control policy. This enables, for example, to reduce the number of signalings which are caused due to repetition of state transition (CONNECTED-IDLE transition) of the mobile terminal and are to be (Continued)

processed by the core network, based on the determination by the core network.

20 Claims, 23 Drawing Sheets

(56) References Cited

U.S. PATENT DOCUMENTS

| | | |
|---|---|---|
| 2007/0287417 A1 | 12/2007 | Abramovich |
| 2008/0031159 A1 | 2/2008 | Jokinen |
| 2008/0057961 A1 | 3/2008 | Sun |
| 2008/0253312 A1 | 10/2008 | Park |
| 2010/0195621 A1 | 8/2010 | Kekki et al. |
| 2010/0232391 A1 | 9/2010 | Olsson |
| 2010/0278108 A1 | 11/2010 | Cho |
| 2010/0302957 A1 | 12/2010 | Ketheesan et al. |
| 2010/0323700 A1 | 12/2010 | Bachmann et al. |
| 2011/0300888 A1 | 12/2011 | Sakumoto |
| 2012/0224476 A1* | 9/2012 | Jin ................ H04L 5/0091 370/229 |
| 2012/0322489 A1* | 12/2012 | Liu ................ H04W 76/20 455/514 |
| 2014/0064124 A1 | 3/2014 | Paladugu |
| 2014/0155019 A1 | 6/2014 | Schwartz |

FOREIGN PATENT DOCUMENTS

| | | |
|---|---|---|
| EP | 1892895 A1 | 2/2008 |
| JP | H 11-313370 A | 11/1999 |
| JP | 2004080584 A | 3/2004 |
| JP | 2008-011452 A | 1/2008 |
| JP | 2009-525681 A | 7/2009 |
| JP | 2009-260895 A | 11/2009 |
| JP | 2010028168 A | 2/2010 |
| JP | 2010-239485 A | 10/2010 |
| JP | 2010539830 A | 12/2010 |
| JP | 2016-244105 A | 4/2017 |
| JP | 2017-077016 A | 4/2017 |
| RU | 2370894 C2 | 10/2009 |
| WO | 2009/062303 A1 | 5/2009 |
| WO | 2009/125799 A1 | 10/2009 |
| WO | 2010097054 A1 | 9/2010 |
| WO | 2010145145 A1 | 12/2010 |

OTHER PUBLICATIONS

Communication dated Feb. 9, 2016 from the Japanese Patent Office in counterpart application No. 2012-551748.
Communication dated Jun. 1, 2016, from the Korean Intellectual Property Office in corresponding application No. 10-2015-7017430.
Communication dated Oct. 12, 2015 from the Russian Patent Office in counterpart application No. 2013136564/08.
Communication dated Sep. 13, 2016 from the European Patent Office in counterpart application No. 11854707.4.
Communication from the Japanese Patent Office dated Dec. 26, 2017 in counterpart Japanese Patent Application JP2012-551748.
Canadian Office Action, dated Dec. 2, 2014.
International Search REpot (ISR) (PCT Form PCT/ISA/210), in PCT/JP2011/006474, dated Jan. 24, 2012.
3GPP TS 23, 401 V10.0.0 (20101-06), "General Packet Radio Service (GPRS) enhancements for Evolved Universal Terrestrial Radio Access Network (E-UTRAN) access (Release 10)", Section 4.6.3, Section 5.3.4, and Section 5.3.5, Jun. 2010.
3GPP TS 36.331 V9.1.0 (Jun. 2009), "Evolved Universal Terrestrial Radio Access (E-UTRA) Radio Resource Control (RRC); Protocol specification (Release 9)", Section 4.2.1, Section 5.3.8, and Section 5.3.9, Jan. 2010.
3GPP TS 24.301 V9, 1.0 (Dec. 2009), "Non-Access-Stratum (NAS) protocol for Evolved Packet System (EPS); Stage 3", Section 5.3.1.2, Dec. 2009.
3GPP TS 36.300 Evolved Universal Terrestrial Radio Access (E-UTRA) and Evolved Universal Terrestrial Radio Access Network (E-UTRAN); Overall Description.
Communication dated Jan. 9, 2018 from the Japanese Patent Office in counterpart Japanese Patent Application No. 2016-244105.

* cited by examiner

| PRIMARY KEY | |
|---|---|
| ITEM | VALUE |
| CONTROL TARGET TERMINAL (TERMINAL ID) | 0001 |
| STATE CONTROL POLICY | |
| ITEM | VALUE |
| IDLE TRANSITION INTERVAL (sec) | 120 |

| PRIMARY KEY | |
|---|---|
| ITEM | VALUE |
| CONTROL TARGET TERMINAL (TERMINAL ID) | 0001 |

| STATE CONTROL POLICY | |
|---|---|
| ITEM | VALUE |
| IDLE TRANSITION INTERVAL (sec) | 120 |
| BLOCK POLICY | TERMINAL REQUEST O&M SERVER REQUEST |

Fig. 10

| PRIMARY KEY | |
|---|---|
| ITEM | VALUE |
| CONTROL TARGET TERMINAL (TERMINAL ID) | 0001 |
| STATE CONTROL POLICY | |
| ITEM | VALUE |
| IDLE TRANSITION INTERVAL (sec) | 120 |
| RADIO CONTROL POLICY DRX VALUE (msec) | 10 |

Fig. 14

| PRIMARY KEY | |
|---|---|
| ITEM | VALUE |
| SUBSCRIBER ID | 0001 |
| STATE CONTROL POLICY | |
| ITEM | VALUE |
| IDLE TRANSITION INTERVAL (sec) | 120 |

| SITUATION OF MOBILE TERMINAL (MOVEMENT FREQUENCY AND COMMUNICATION FREQUENCY PER UNIT TIME) | STATE CONTROL POLICY |
|---|---|
| MOVEMENT FREQUENCY ≧ COMMUNICATION FREQUENCY | POLICY A |
| MOVEMENT FREQUENCY < COMMUNICATION FREQUENCY | POLICY B |

Fig. 27

| SITUATION OF MOBILE TERMINAL (CONNECTION DESTINATION NETWORK) | STATE CONTROL POLICY |
|---|---|
| NETWORK A | POLICY A |
| NETWORK B | POLICY B |
| NETWORK C | POLICY C |

Fig. 28

| SITUATION OF MOBILE TERMINAL | | STATE CONTROL POLICY |
|---|---|---|
| TERMINAL OR GROUP | TIME PERIOD | |
| TERMINAL A | 08:00 - 19:00 | POLICY A |
| TERMINAL A | 19:00 - 08:00 | POLICY B |
| TERMINAL B | 10:00 - 20:00 | POLICY C |
| TERMINAL B | 20:00 - 10:00 | POLICY D |
| GROUP C | 09:00 - 21:00 | POLICY E |
| GROUP C | 21:00 - 09:00 | POLICY F |

| PRIMARY KEY | |
|---|---|
| ITEM | VALUE |
| CONTROL TARGET TERMINAL (TERMINAL ID) | 0001 |
| STATE CONTROL POLICY | |
| ITEM | VALUE |
| BLOCK POLICY | TERMINAL REQUEST<br>O&M SERVER REQUEST |

POLICY DETERMINATION SYSTEM, POLICY DETERMINATION METHOD, AND NON-TRANSITORY COMPUTER-READABLE MEDIUM

CROSS REFERENCE TO RELATED APPLICATIONS

This is a Continuation Application of application Ser. No. 13/996,511 filed Jun. 20, 2013, which is a 371 National Stage Application of PCT/JP2011/006474 filed Nov. 21, 2011, which claims priority based on Patent Application No. JP 2011-000991 filed Jan. 6, 2011, the contents of all of which are incorporated by reference herein in their entirety.

TECHNICAL FIELD

The present invention relates to a mobile communications system that has been studied in the 3GPP (3rd Generation Partnership Project), 3GPP2, WiMAX Forum, and the like, and more particularly, relates to a method for controlling a state transition of a mobile terminal between a CONNECTED state and an IDLE state.

BACKGROUND ART

FIG. 4 is a block diagram showing a general configuration example of a mobile communications system. In FIG. 4, nodes having nothing to do with the Background Art section, and nodes unnecessary for explanation are omitted. In FIG. 4, a core network 10 is managed by an operator that mainly provides mobile communication services. The core network 10 is, for example, a packet switching network (EPC (Evolved Packet Core)) of an EPS (Evolved Packet System) or a packet switching core network of a UMTS (Universal Mode Telecommunications System) of the 3GPP, a packet switching core network of CDMA2000 of the 3GGP2, or a packet switching core network of a CSN (Connectivity Service Network) of the WiMAX Forum.

A radio access network 20 includes a radio base station 910 and a mobile terminal 930. The radio base station 910 has a function of connecting to the mobile terminal 930 by a radio access technique. The core network 10 includes a mobility management node 200. The mobility management node 920 performs mobility management and authentication (security control) of the terminal 930 during radio access, and manages setting processes and control signals for a user data transfer path between the core network 10 and the radio base station 910. The mobile terminal 930 has a radio interface, and connects to the radio base station 910 by the radio access technique and also connects to the core network 10.

In the EPS of the 3GPP, the radio base station 910 corresponds to an eNB (Enhanced NodeB); the mobility management node 920 corresponds to an MME (Mobility Management Entity); and the mobile terminal 930 corresponds to a UE (User Equipment). As the radio access technique, LTE (Long Term Evolution) is employed.

In the UMTS of the 3GPP, the radio base station 910 corresponds to functions of an RNC (Radio Network Controller) and an NB (NodeB). The mobility management node 200 corresponds to an SGSN (Serving GPRS Support Node), and the mobile terminal 300 corresponds to the UE (User Equipment). As the radio access technique, W-CDMA (Wideband Code Division Multiple Access) is employed.

In the CDMA2000 system of the 3GGP, the radio base station 100 corresponds to a BS (Base Station); the mobility management node 200 corresponds to a PDNS (Packet Data Serving Node); and the mobile terminal 300 corresponds to an MS (Mobile Station). As the radio access technique, EV-DO (Evolution-Data Optimized) is employed.

In a communication system of the WiMAX Forum, the radio base station 100 corresponds to functions of an ASN-GW (Access Service Network Gateway) and the BS (Base Station). The mobility management node 200 corresponds to an HA (Home Agent), and the mobile terminal 300 corresponds to an MS (Mobile Station). As the radio access technique, WiMAX is employed.

Aspects and embodiments of the present invention herein described are not dependent on architectures of mobile communications systems. Accordingly, aspects and embodiments of the present invention can be applied to mobile communications systems standardized in the 3GPP, 3GPP2, and WiMAX Forum. However, the following description will be made with reference to the mobile communications system of the EPS in the 3GPP so as to describe configurations and operations according to aspects and embodiments of the present invention in detail.

In FIG. 33, a radio control including allocation of resources (channels) in a radio section between the mobile terminal 930 and the radio base station 910 is carried out in an RRC (Radio Resource Control) layer, and exchange of control messages and packet communication between the mobile terminal 300 and the core network 10, for example, are carried out in a NAS (Non-Access Stratum) layer which is upper layer of the RRC.

In RRC layer, there are two states of RRC_IDLE and RRC_CONNECTED. In the RRC_CONNECTED state, the radio base station 910 holds information (i.e., RRC context) on an RRC connection between the mobile terminal 930 and the radio base station 910, and transmission and reception of user data in the radio section between the mobile terminal 930 and the radio base station 910 are thereby enabled. On the other hand, in the RRC_IDLE state, the radio base station 100 releases the information (RRC context) on the RRC connection of the mobile terminal 300, discontinuous reception (DRX) that is configured by NAS is indicated to the mobile terminal 300, and therefore the mobile terminal 300 is able to receive a paging signal.

During the discontinuous reception, a radio communication unit included in the mobile terminal 930 is activated to perform a reception operation in accordance with time slots to be received by the mobile terminal 930. During the other time periods, the radio communication unit is brought into a standby state (power-off). Thus, the discontinuous reception provides a great effect of power saving in the mobile terminal 930.

In the NAS layer, there are two states of ECM (EPS Connection Management)_IDLE and ECM_CONNECTED. In the ECM-CONNECTED state, a NAS connection is established between the mobile terminal 930 and the mobility management node 920. The mobility management node 920 accurately recognizes the position of the mobile terminal 930 (i.e., recognizes a radio base station to which the mobile terminal is connected) by using the NAS connection, and performs a handover process when the mobile terminal 930 moves between base stations. On the other hand, the ECM_IDLE state is a state in which the NAS connection is not established between the mobile terminal 930 and the mobility management node 920. In the ECM_IDLE state, the mobility management node 920 performs mobility management of the mobile terminal 930 in units of tracking areas that each includes a plurality of radio base stations. Accordingly, even when the mobile terminal 930 in the ECM_IDLE state moves between radio base stations, no handover process occurs. When the mobile terminal 930 returns to the ECM_CONNECTED state from the ECM_IDLE state, the mobile terminal 930 needs to be synchronized with the core network 10 (i.e., needs to perform location registration).

When the mobile terminal 930 is in ECM_IDLE state and the mobility management node 920 performs the mobility management of the mobile terminal 930 in units of tracking areas, there is no need to perform the handover process even when the mobile terminal 930 moves between radio base stations. This provides an advantage of reducing a load on the core network (including the mobility management node 200).

It can be said that the states (CONNECTED or IDLE) related to connections of the RRC layer and the NAS layer are synchronized. This is because it is necessary to establish a connection in the RRC layer (come into the RRC_CONNECTED state) so as to establish a connection in the NAS layer (come into the ECM_CONNECTED state), and the connection in the NAS layer is established simultaneously with the establishment of the connection in the RRC layer. This is also because when the connection in one of the RRC layer and the NAS layer is released (transits to the IDLE state), the connection in the other layer is also released (transits to the IDLE state).

When the NAS layer transits from the ECM_CONNECTED state to the ECM_IDLE state, an S1 Release Procedure is executed. As an example of a trigger for executing the S1 Release Procedure is a release of RRC-connection (a transition to RRC_IDLE state). When the S1 Release Procedure is executed in the state where the connection in the RRC layer is established (RRC_CONNECTION state), the connection in the RRC layer is also released (transits to RRC_IDLE) That is, when the RRC layer and the NAS layer transit to the IDLE state, the S1 Release Procedure is executed.

On the other hand, when the RRC layer and the NAS layer transit to the CONNECTED state from the IDLE state, a Service Request Procedure is executed. When the Service Request Procedure is executed, the NAS connection and the RRC connection are established.

Here, the definition of terms "CONNECTED state" and "IDLE state" which are used in this specification and the claims is described. The term "IDLE state" refers to a state in which a mobile terminal does not perform signaling for session management and mobility management with a core network, and radio resources in a radio access network such as E-UTRAN are released, as in the case of the ECM_IDLE state and the RRC_IDLE state of the 3GPP described above. On the other hand, the term "CONNECTED state" refers to a state in which radio resources for sending and receiving control signals (control messages) for session management and mobility management between at least a mobile terminal and a core network are secured in a radio access network, and the control signals (control messages) can be sent and received between the mobile terminal and the core network, as in the case of the ECM_CONNECTED state and the RRC_CONNECTED state of the 3GPP described above. That is, it is only necessary that the "CONNECTED state" is be a state in which a mobile terminal is connected to a core network so as to enable transmission and reception of control signals (control messages) for at least session management and mobility management. In other words, the "CONNECTED state" does not require a state in which a bearer for transferring user data between a mobile terminal and an external packet data network (PDN) is established.

CITATION LIST

Non Patent Literature

Non Patent Literature 1: 3GPP TS 23.401 V10.0.0 (2010 June), "General Packet Radio Service (GPRS) enhancements for Evolved Universal Terrestrial Radio Access Network (E-UTRAN) access (Release 10)", Section 4.6.3, Section 5.3.4, and Section 5.3.5, June, 2010

Non Patent Literature 2: 3GPP TS 36.331 V9, 1.0 (2009 December), "Evolved Universal Terrestrial Radio Access (E-UTRA) Radio Resource Control (RRC); Protocol specification (Release 9)", Section 4.2.1, Section 5.3.8, and Section 5.3.9, January, 2010

Non Patent Literature 3: 3GPP TS 24.301 V9.1.0 (2009 December), "Non-Access-Stratum (NAS) protocol for Evolved Packet System (EPS); Stage 3", Section 5.3.1.2, December, 2009

SUMMARY OF INVENTION

Technical Problem

As described in the Background Art section, when the radio connection of the mobile terminal 930 is released (transits to RRC_IDLE) in a radio resource management layer between the mobile terminal 930 and the radio base station 910, the S1 Release Procedure for releasing the connection of the upper layer (NAS layer) is executed as well. Also when the RRC layer transits from the RRC_IDLE state to the RRC_CONNECTED state, the Service Request Procedure for establishing the connection of the upper layer (NAS layer) is executed as well. Upon execution of the S1 Release Procedure or the Service Request Procedure, a plurality of signalings is exchanged between the mobile terminal 930 and the core network 10.

Many of recent mobile terminals including smartphones, which place importance on power saving, operate to release a radio connection immediately when there is no communication, and to cause the state of each of the radio resource management layer and the upper layer to transit to the IDLE state. Meanwhile, as a tendency for application programs that run on a mobile terminal, the number of application programs that periodically connects with a server to send and receive information is increasing. As a result, the recent mobile terminals operate to transit to the IDLE state immediately after completion of communication and then transit to the CONNECTED state immediately for an application that periodically performs communication. That is, the phenomenon in which a mobile terminal repeatedly transits between the IDLE state and the CONNECTED state occurs in many cases. This causes a problem that the number of signalings to be processed by the core network 10 increases, resulting in an increase in load on the core network 10.

As a method for reducing the number of signalings caused due to repetition of the state transition of the mobile terminal 930, it is possible to execute control for adjusting a timing of the transition from the CONNECTED state to the IDLE state in the mobile terminal 930. If the state transition of the mobile terminal 930 can be optimized, a reduction in the number of signalings caused due to repetition of state transition can be expected. However, in the present specifications for mobile communications systems, such as the 3GPP, it is impossible for the core network 10 (for example, the mobility management node 920) to control the timing of the state transition of the mobile terminal 930 between the CONNECTED state and the IDLE state (hereinafter referred to as "CONNECTED-IDLE transition"). On the other hand, when a state transition request arrives from the mobile terminal 930, the core network 10 accepts the state transition request. That is, there is a problem that it is impossible for the core network 10 to proactively (i.e., based on the determination by the core network 10) perform control related to the CONNECTED-IDLE transition of the mobile terminal 930, such as control for changing a time interval for the mobile terminal 930 to transit from the CONNECTED state to the IDLE state, or control for blocking the state transition request from the mobile terminal 930, for example. In other words, there is a problem that the core network 10 cannot control the timing of the CONNECTED-IDLE transition of the mobile terminal 930.

It is an object of the present invention to provide a policy determination system, a policy determination method, and a program, which contribute to red icing, based on the determination by the core network 10, the number of signaling which are caused due to repetition of the state transition of the mobile terminal 930 (i.e., CONNECTED-IDLE transition) and are to be processed by the core network 10.

Solution to Problem

A first aspect of the present invention includes a policy determination system. The policy determination system is arranged in a core network and is capable of communicating with a control apparatus arranged in a radio access network including a radio base station. The control apparatus is configured to perform control related to a state transition between a CONNECTED state and an IDLE state of a mobile terminal connected to the radio base station, based on a control policy supplied from the policy determination system. The policy determination system includes: a policy determination unit that determines the control policy according to a situation of the mobile terminal; and a notification unit that notifies the control apparatus of the control policy.

A second aspect of the present invention includes a policy determination method. The policy determination method is carried out by a policy determination system that is arranged in a core network and is capable of communicating with a control apparatus arranged in a radio access network including a radio base station. The control apparatus is configured to perform control related to a state transition between a CONNECTED STATE and an IDLE state of a mobile terminal connected to the radio base station, based on a control policy supplied from the policy determination system. The policy determination method according to this aspect includes: determining the control policy according to a situation of the mobile terminal; and notifying the first control node of the control policy.

A third aspect of the present invention is a program for causing a computer to execute the method according to the above-described second aspect of the present invention.

Advantageous Effects of Invention

According to the above-described aspects of the present invention, it is possible to provide a policy determination system, a policy determination method, and a program, which contribute to reducing the number of signalings which are caused due to repetition of a state transition of a mobile terminal (i.e., CONNECTED-IDLE transition) and are to be processed by the core network, based on the determination by the core network.

BRIEF DESCRIPTION OF DRAWINGS

FIG. 10 is a table showing an example of a state control policy in the second embodiment;

FIG. 14 is a table showing an example of a state control policy in the third embodiment;

FIG. 27 is a table showing a first example of a rule that defines a relationship between situations of mobile terminal and state control policies in the sixth embodiment;

FIG. 28 is a table showing a second example of a rule that defines a relationship between situations of mobile terminal and state control policies in the sixth embodiment;

DESCRIPTION OF EMBODIMENTS

Figure 1:
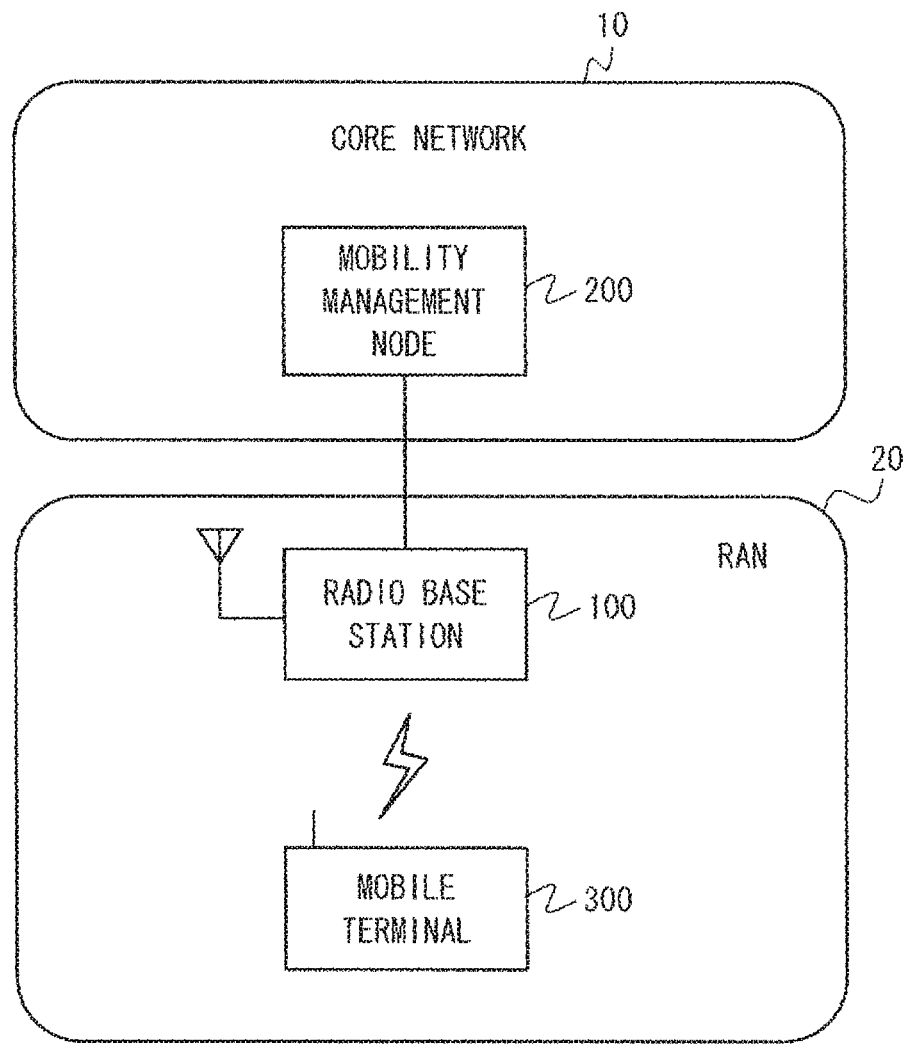
FIG. 1 is a diagram showing a configuration example of a mobile communications system in a first embodiment.

Hereinafter, embodiments to which the present invention is applied will be described in detail with reference to the drawings. In the drawings, identical or corresponding elements are denoted by the same reference numerals, and a redundant explanation thereof is omitted as appropriate for clarification of the explanation.

First Embodiment

Figure 33:
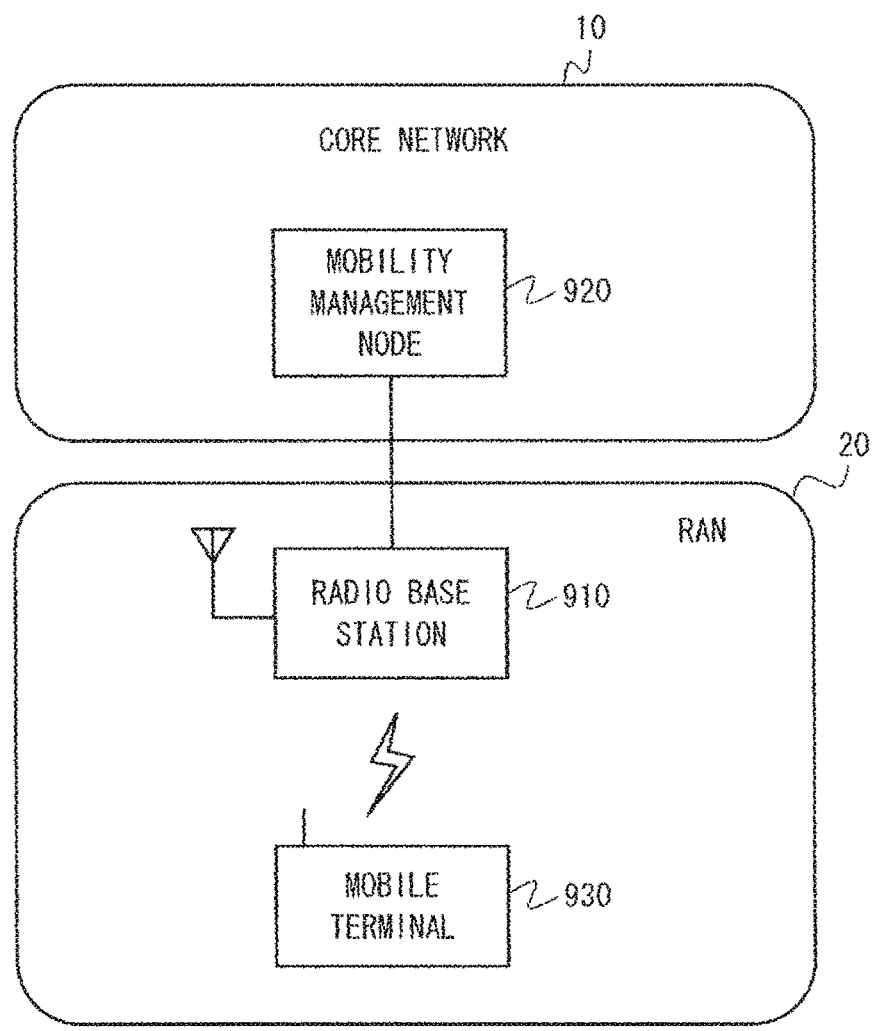
FIG. 33 is a diagram showing a configuration example of a mobile communications system according to a background art.

FIG. 1 is a block diagram showing a configuration example of a mobile communications system according to this embodiment. The system shown in FIG. 1 includes a mobility management node 20 arranged in a core network 10, a radio base station TOO, and a mobile terminal 300. An arrangement and basic functions and operations of the mobility management node 200, the radio base station 100, and the mobile terminal 300 are similar to those of the mobility management node 920, the radio base station 910, and the mobile terminal 930 which are shown in FIG. 33.

The mobility management node 200 is configured to be able to acquire a policy related to control for CONNECTED-IDLE transition of the mobile terminal 300. Control for states of the mobile terminal 300 including control for CONNECTED-IDLE transition is hereinafter referred to as "state control". Policies related to "state control" for the mobile terminal 300 are referred to as "a state control policy". The state control policy is individually determined for each mobile terminal 300. The state control policy may be managed by the mobility management node 200 itself, or may be managed by another node that is accessible from the mobility management node 200. The state control policy is used to control the adjustment of a timing of a state transition of the mobile terminal 300 between a CONNECTED state and an IDLE state. The state control policy includes, for example, at least one of designation of a time interval in which the mobile terminal 300 transits from the CONNECTED state to the IDLE state (hereinafter referred to as "IDLE transition interval") and designation as to whether or not to block a state transition request from the mobile terminal 300 or an O&M server.

Further, the mobility management node 200 is configured to be able to determine a terminal as a state control target from among a plurality of mobile terminals 300 connected to a plurality of radio base stations 100 under management of the mobility management node 200. A number of variations of the method for determining a control target terminal and of the timing of the determination can be made. Specific examples of the method for determining a control target terminal and the timing of the determination will be described in detail in second and subsequent embodiments described later. For example, the mobility management node 200 may determine a control target terminal according to a load status of signaling of the core network 10.

The mobility management node 200 notifies the radio base station 100, to which the terminal 300 is connected, of the state control policy applied to the terminal 300 which is determined as the control target. The notification of the state control policy to the base station 100 may be performed by sending, from the mobility management node 200 to the base station 100, a state control request message that includes a terminal ID of the terminal 300 determined as the control target and the state control policy, for example.

The radio base station 100 is configured to be able to receive, from the mobility management node 200, the terminal ID, which allows identification of the terminal 300 determined as the control target, and the state control policy. Based on the received state control policy, the radio base station 100 performs a state control (i.e., control for CONNECTED-IDLE transition) for the terminal 300 determined as the control target. As a specific example, the base station 100 may change the "IDLE transition interval" which is applied to the mobile terminal 300 determined as the control target. Further, the base station 100 may start blocking of the state transition request having arrived from the mobile terminal 300 determined as the control target.

According to the mobility management node 200 and the radio base station 100 of this embodiment, the core network 10 can proactively control the timing of the CONNECTED-IDLE transition of the mobile terminal 300 based on the determination by the core network 10 (i.e., the mobility management node 200). Accordingly, the number of signalings which are caused due to repetition of the CONNECTED-IDLE transition of the mobile terminal 300 and which are to be processed by the core network 10 can be reduced based on the determination by the core network 10.

Figure 2:
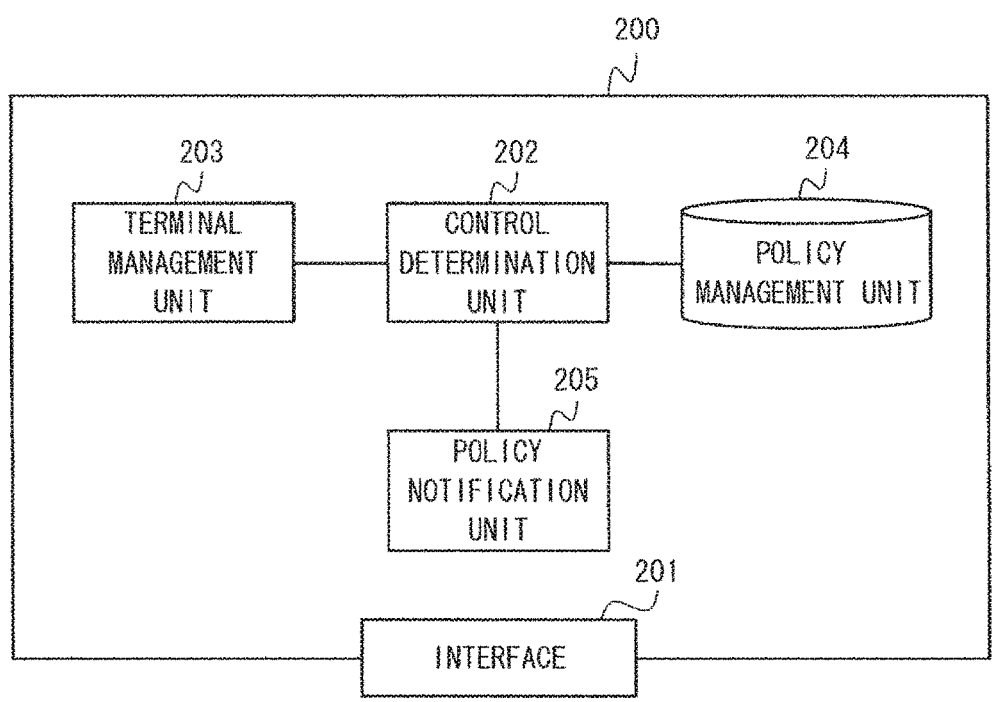
FIG. 2 is a diagram showing a configuration example of a mobility management node according to the first embodiment.

The configuration and operation of the mobility management node 200 and the radio base station 100 in this embodiment will be described below. FIG. 2 is a block diagram showing a configuration example of the mobility management node 200. The mobility management node 200 shown in FIG. 2 includes an interface 201, a control determination unit 202, a terminal management unit 203, a policy management unit 204, and a policy notification unit 205. Note that FIG. 2 shows components in a major portion necessary for explanation of this embodiment, and the illustration of the other portion is omitted.

The interface 201 is an interface available for communication with the radio base station 100. The interface 201 is used for transmission and reception of control signals (messages) related to the state control of the mobile terminal 300.

The control determination unit 202 determines a mobile terminal as a state control target from among the plurality of mobile terminals 300 connected to the plurality of radio base stations 100. Further, the control determination unit 202 acquires a control policy corresponding to the control target terminal from the policy management unit 204, and notifies the radio base station 100, to which the control target terminal is connected, of the terminal ID of the control target terminal and the control policy applied thereto. The terminal ID herein described is an ID that allows unique identification of the mobile terminal 300 on the mobile communications system. Specific examples of the ID include IMSI (International Mobile Subscriber Identity), IMEI (International Mobile Equipment Identity), and GUTI (Globally. Unique Temporary ID). The control determination unit 202 may acquire the terminal ID of the terminal in the case of determining the control target terminal.

A number of variations of the method for specifying the control target terminal by the control determination unit 202 can be made. Further, a number of variations of the timing of determining the control target terminal can be made as follows. That is, for example, the control is started at the timing when a mobile terminal has just connected, or the communication characteristics of the mobile terminal are monitored and the control is started for the mobile terminal that satisfies a certain condition. A specific method for specifying the control target terminal will be described in the second and subsequent embodiments.

The terminal management unit 203 is a function unit that performs mobility management of the mobile terminal 300, and recognizes the mobile terminals 300 that have connected (attached) to a plurality of radio base stations 100. Upon receiving, from the control determination unit 202 using the terminal ID of the control target terminal, an inquiry as to the base station 10 to which the control target terminal has connected, the terminal management unit 203 notifies the control determination unit 202 of the base station ID of the radio base station 100 to which the mobile terminal 300 corresponding to the terminal ID is currently connected.

Figures 3, 4:
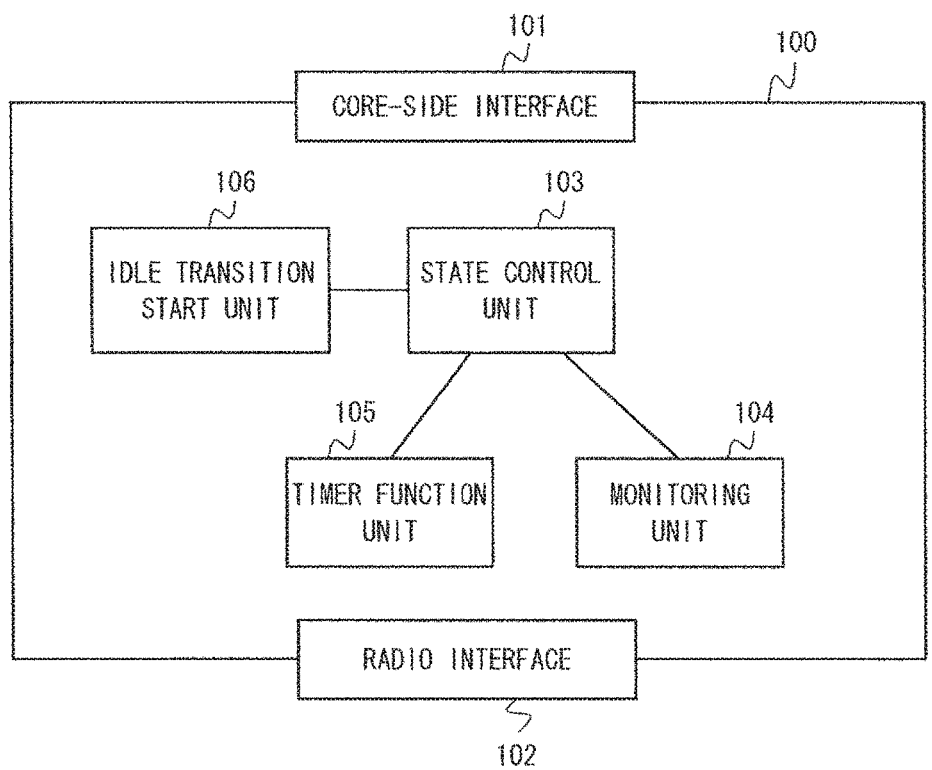
FIG. 3 is a table showing an example of a state control policy according to the first embodiment.
FIG. 4 is a diagram showing a configuration example of a radio base station according to the first embodiment.

The policy management unit 204 stores the state control policy related to the state transition of the mobile terminal 300. The state transition policy in this embodiment is recorded for each mobile terminal, and includes a description of the IDLE transition interval of the mobile terminal 300. FIG. 3 shows an example of the state control policy managed by the policy management unit 204. In the example of FIG. 3, the terminal ID of the control target terminal is configured as a primary key, and the state control policy corresponding to the primary key is managed. In the example of FIG. 3, the IDLE transition interval is registered as a state control policy.

Upon acquiring, from the control determination unit 202, the terminal ID of the control target terminal, the state control policy to be applied to the control target terminal, and the base station ID of the radio base station 100 to which the control target terminal is currently connected, the policy notification unit 205 sends a state control request to the radio base station 100 corresponding to the base station ID. The state control request includes the terminal ID of the control target terminal and the state control policy.

FIG. 4 is a block diagram showing a configuration example of the radio base station 100 in this embodiment. The radio base station 100 shown in FIG. 4 includes a core-side interface 101, a radio interface 102, a state control unit 103, a monitoring unit 104, a timer function unit 105, and an IDLE transition start unit 106. Note that FIG. 4 shows components in a major portion necessary for explanation of this embodiment, and the illustration of the other portion is omitted.

The core-side interface 101 is an interface available for communication with the mobility management node 200 arranged in the core network 10. The interface 101 is used for reception of the state control request from the mobility management node 200, and for transmission of a response to the mobility management node 200.

The radio interface 102 is an interface for performing radio communication between the radio base station 100 and the mobile terminal 300.

The state control unit 103 receives the state control request sent from the mobility management node 200 via the core-side interface 101. Further, the state control unit 103 has a function of executing a state control (control for CONNECTED-IDLE transition) for the control target terminal by activating the monitoring unit 104, the timer function unit 105, and the IDLE transition start unit 106 based on the terminal ID and the state control policy which are included in the state control request. The state control operation performed by the base station 100 including the operation of the state control unit 103 will be described in detail later.

The monitoring unit 104 has a function of monitoring a communication state of a monitoring target terminal (i.e., monitoring whether to transmit or receive data). The monitoring unit 104 receives, from the state control unit 103, the terminal ID of the mobile terminal 300 as the monitoring target, and monitors the communication state of the mobile terminal 300 corresponding to the received terminal After confirming the state in which the monitoring target terminal is not performing data communication, the monitoring unit 104 notifies the state control unit 103 of the terminal ID and information indicating the state in which data communication is not performed. Further, after confirming that data communication is resumed from the state in which the monitoring target terminal is not performing data communication, the monitoring unit 104 notifies the state control unit 103 of the terminal ID and information indicating that data communication is resumed.

The timer function unit 105 has a function of measuring the IDLE transition interval for each mobile terminal. Upon receiving, from the state control unit 103, the terminal ID of the mobile terminal 300 to be measured and the IDLE transition interval, the timer function unit 105 secures a timer for the mobile terminal corresponding to the acquired terminal ID in a memory. This terminal ID is the terminal ID of the control target terminal which is notified from the mobility management node 200. This IDLE transition interval is the IDLE transition interval included in the state control policy notified from the mobility management node 200. Further, upon receiving a timer start request including the terminal ID from the state control unit 103, the timer function unit 105 starts a measurement using the timer for the mobile terminal corresponding to the terminal ID. Then, when the timer for the mobile terminal reaches the configured IDLE transition interval, the timer function unit 105 sends to the state control unit 103 an expiration notification including the terminal ID of the mobile terminal after expiration of the interval.

Upon receiving the IDLE transition start request including the terminal ID from the state control unit 103, the IDLE transition start unit 106 starts a process for causing the mobile terminal 300 corresponding to the received terminal ID to transit from the CONNECTED state to the IDLE state. A specific example of the process for causing the mobile terminal 300 to transit from the CONNECTED state to the IDLE state is S1 RELEASE PROCEDURE.

Figure 5:
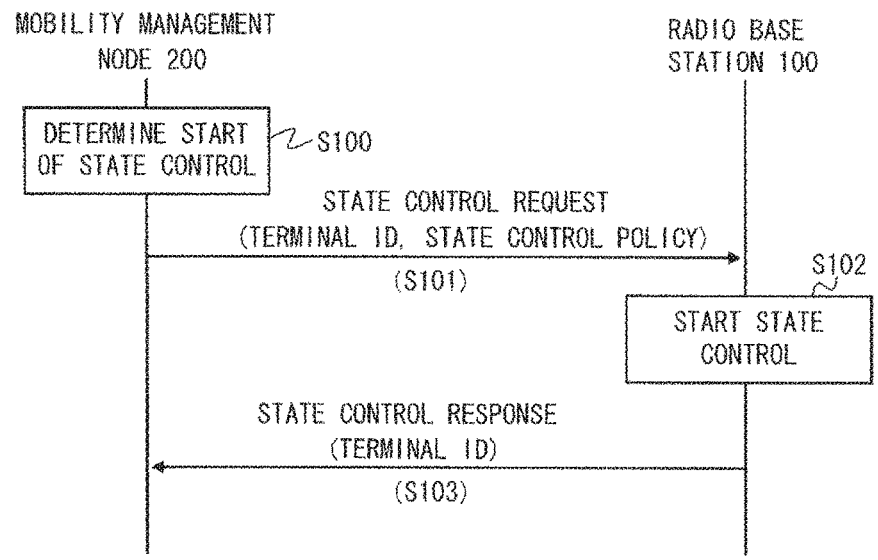
FIG. 5 is a sequence diagram showing a flow of processes in which the mobility management node requests the radio base station to perform a state control of a mobile terminal in the first embodiment.

Subsequently, a flow of processes in which the mobility management node 200 requests the radio base station 100 to perform the state control of the mobile terminal 300 will be described with reference to the sequence diagram of FIG. 5.

First, in step S100, the mobility management node 200 determines a mobile terminal as a state control target, acquires a state control policy to be applied to the control target terminal, and specifies the radio base station 200 to which the control target terminal has connected.

In step S101, the mobility management node 200 sends, to the radio base station 100 to which the control target terminal has attached, the state control request including the terminal ID of the control target terminal and the state control policy to be applied to the control target terminal.

In step S102, the radio base station 100 starts the state control based on the terminal ID and the state control policy which are received from the mobility management node 200.

In step S103, the radio base station 100 notifies the mobility management node 200 of a state control response indicating that the execution of the control is started.

Figure 6:
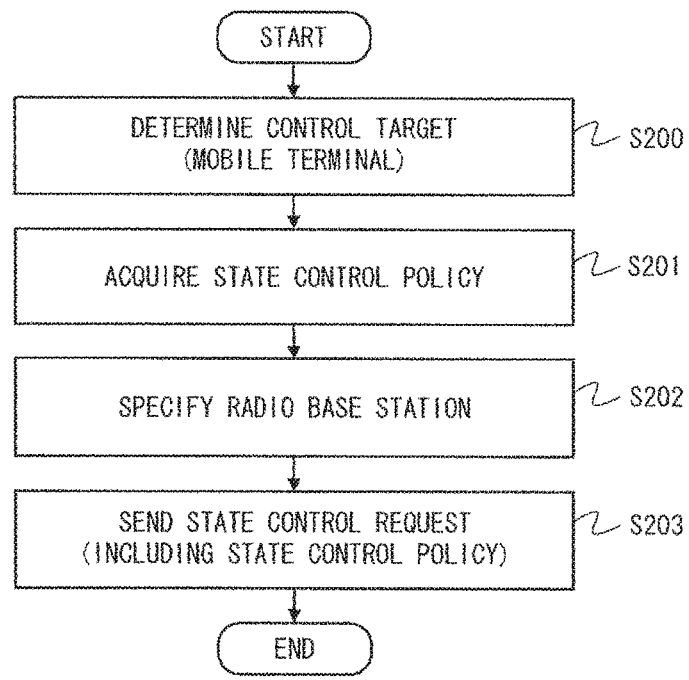
FIG. 6 is a flowchart showing an operation example when the mobility management node transmits a state control request in the first embodiment.

Referring next to the flowchart of FIG. 6, an operation example when the mobility management node 200 sends the state control request to the radio base station 100 will be described. First, in step S200, the control determination unit 202 determines the start of the state control for a specific mobile terminal (i.e., control target terminal). The control determination unit 202 acquires the terminal ID of the control target terminal according to the determination of the control target terminal. In step S201, the control determination unit 202 acquires, from the policy management unit 204, the state control policy corresponding to the terminal ID of the control target terminal.

In step S202, the control determination unit 202 sends an inquiry to the terminal management unit 203 by using the terminal ID of the control target terminal, thereby receiving the base station ID of the radio base station 100 to which the control target terminal is currently connected. In step S203, the control determination unit 202 notifies the policy notification unit 205 of the terminal ID of the control target terminal, the state control policy, and the base station ID of the radio base station to which the control target terminal has connected. The policy notification unit 205 sends, to the radio base station 100 corresponding to the base station ID, the state control request including the terminal ID and the control policy which are received from the control determination unit 202.

Figure 7:
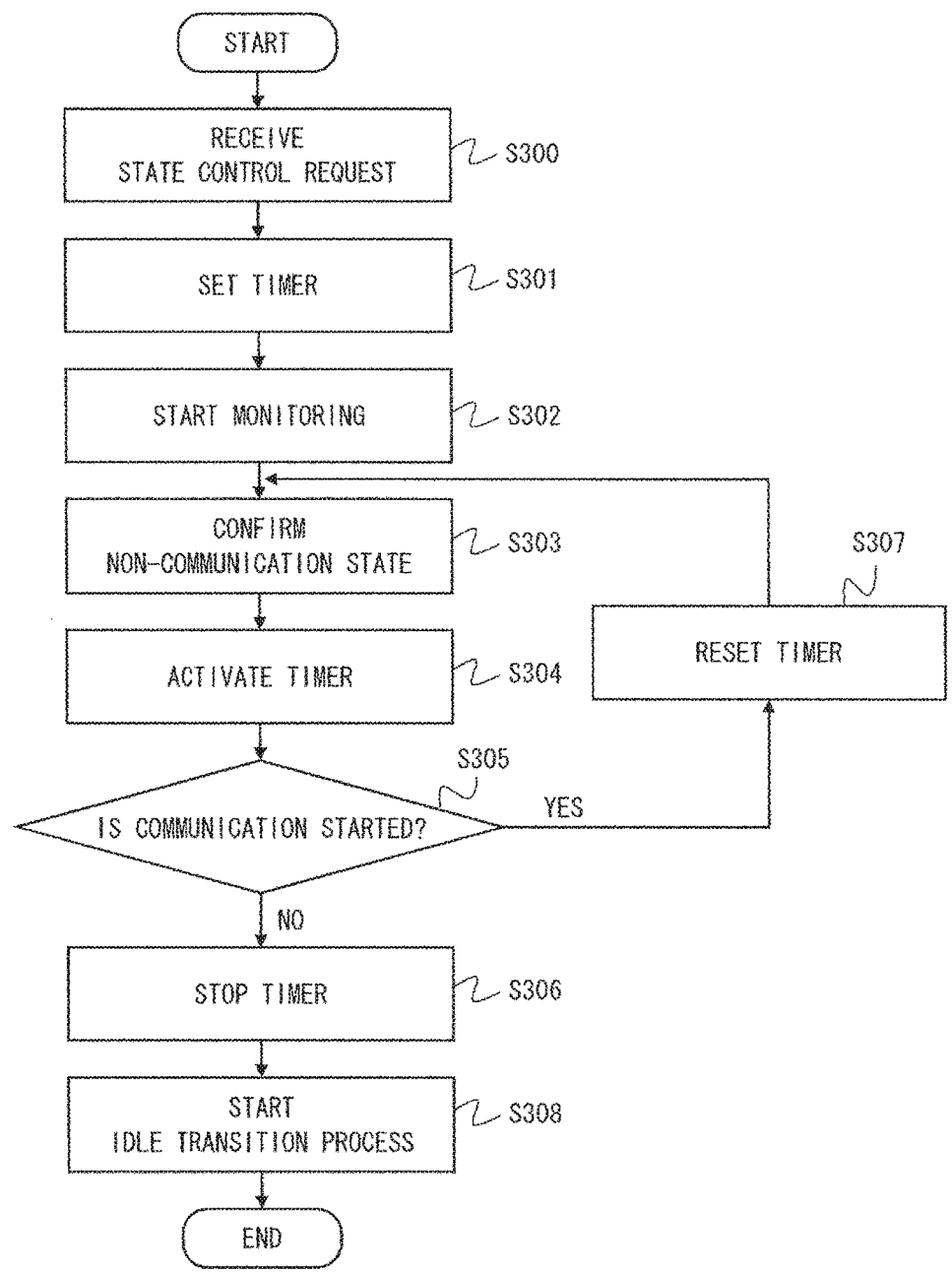
FIG. 7 is a flowchart showing an operation example when the radio base station executes the state control for the mobile terminal in the first embodiment.

Referring next to the flowchart of FIG. 7, an operation example when the radio base station 300 executes the state control for the mobile terminal 100 will be described. First, in step S300, the state control unit 103 receives the state control request via the core-side interface 101. In step S301, the state control unit 103 acquires, from the state control request, the terminal ID of the control target terminal and the IDLE transition interval, which is a parameter within the state control policy, and sets the terminal ID and the IDLE transition interval to the timer function unit 105.

In step S302, the state control unit 103 notifies the monitoring unit 104 of the terminal ID of the control target terminal which is obtained from the state control request. The monitoring unit 104 starts monitoring the data communication of the mobile terminal 300 corresponding to the notified terminal ID. In step S303, after confirming the state in which the monitoring target terminal is not performing data communication, the monitoring unit 104 notifies the state control unit 103 of the terminal ID of this mobile terminal.

In step S304, the state control unit 103 notifies the timer function unit 105 of the timer start request as well as the terminal ID included in the notification received from the monitoring unit 104 in step S303. The timer function unit 105 starts counting the IDLE transition interval configured in step S301 with respect to the terminal ID designated by the timer start request.

In step S305, the state control unit 103 monitors whether to receive from the monitoring unit 104 a notification indicating that the data communication of the mobile terminal determined as a counting target is resumed before the count of the timer function unit 105, which is started in step S304, reaches the IDLE transition interval. When the data communication is not resumed before the count of the timer function unit 105 reaches the IDLE transition interval, the process proceeds to S306. When the data communication is resumed, the process proceeds to S307.

In step S306, the timer function unit 105 stops the timer when the count started in step S304 reaches the IDLE transition interval, and sends to the state control unit 103 a notification indicating that the configured time interval is expired, as well as the terminal ID of the mobile terminal of the counting target.

In step S307, upon confirming that the data communication of the mobile terminal of the counting target is resumed, the monitoring unit 104 notifies the state control unit 103 of the terminal ID of the mobile terminal and a notification indicating resuming of data communication. Upon receiving the notification from the monitoring unit 104, the state control unit 103 notifies the timer function unit 105 of the target terminal ID and a notification indicating that the count time of the timer is reset. The timer function unit 105 resets the count time of the timer corresponding to the received terminal ID.

In step S308, upon receiving the notification indicating that the configured time interval is expired in step S307 from the timer function unit 105, the state control unit 103 sends to the IDLE transition start unit 106 the terminal ID notified from the timer function unit 105. The IDLE transition start unit 106 starts a process for causing the mobile terminal 300 corresponding to the terminal ID received from the state control unit 103 to transit from the CONNECTED state to the IDLE state (i.e., IDLE transition process).

After starting the IDLE transition control in step S308, the base station 100 of this embodiment may repeatedly perform the step S302 and subsequent steps shown in FIG. 3, when the terminal 300 which has been caused to transit to the IDLE state transits to the CONNECTED state again.

According to the specific example described in this embodiment, the time period in which the mobile terminal 300 transits from the CONNECTED state to the IDLE state (i.e., IDLE transition interval) can be configured for each mobile terminal 300 from the mobility management node 200 arranged in the core network 10.

Second Embodiment

This embodiment illustrates a modification of a specific example (that is, IDLE transition interval) of parameters designated by the state control policy described in the first embodiment. Specifically, in this embodiment, in addition to the IDLE transition interval of the mobile terminal 300, a policy for blocking a request or an event that triggers transition of the mobile terminal 300 from the CONNECTED state to the IDLE state is added as one of the parameters of the state control policy.

Figure 8:
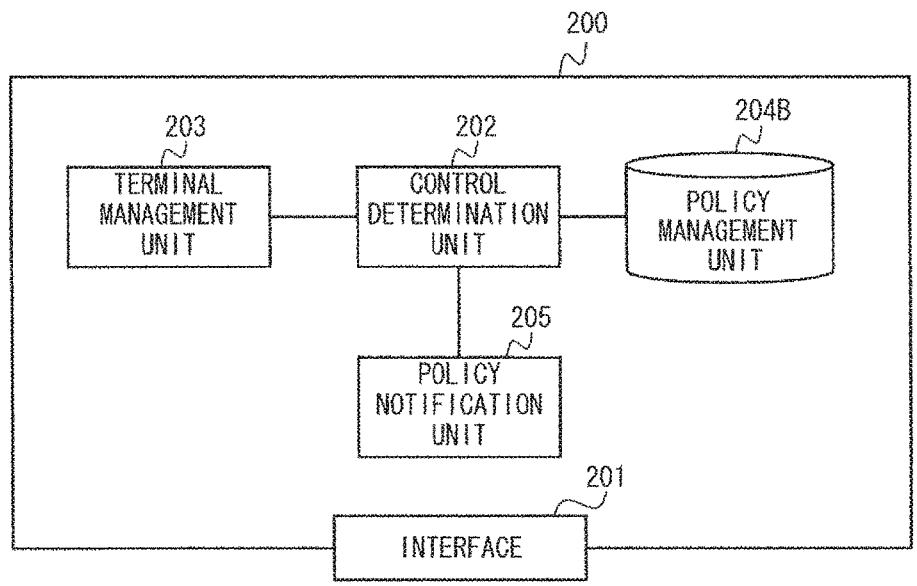
FIG. 8 is a diagram showing a configuration example of a mobility management node in a second embodiment.

FIG. 8 is a block diagram showing a configuration example of the mobility management node 200 in this embodiment. In the example of FIG. 8, parameters included in the state control policy which is held in a policy management unit 204B are partially different from the parameters of the state control policy which is held in the policy management unit 204 shown in FIG. 2. The other elements shown in FIG. 8 are similar to the corresponding elements of FIG. 2.

Figure 9:
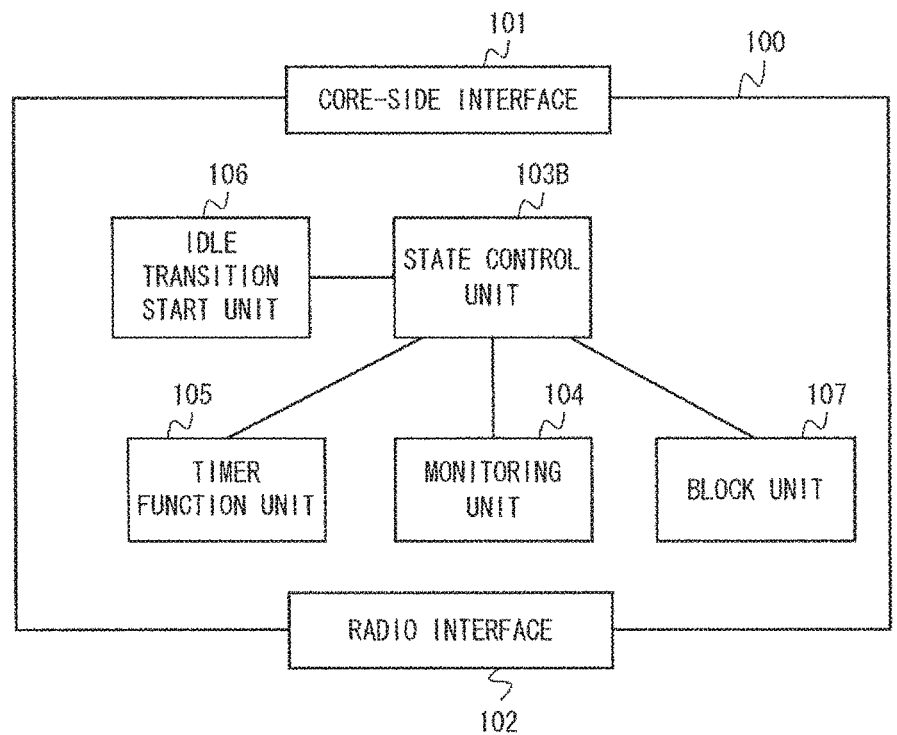
FIG. 9 is a diagram showing a configuration example of a radio base station in the second embodiment.

FIG. 9 is a block diagram showing a configuration example of the radio base station 100 in this embodiment. As compared with the configuration example shown in FIG. 4, a block unit 107 is added in the example of FIG. 9. The functions of a state control unit 103B shown in FIG. 9 are partially different from the functions of the state control unit 103 shown in FIG. 4. The other elements shown in FIG. 9 are similar to the corresponding elements of FIG. 4.

The policy management unit 204B of the mobility management node 200 stores the state control policy including a policy for blocking a request or an event that triggers transition of the mobile terminal 300 to the IDLE state (referred to as a block policy), as well as the IDLE transition interval of the mobile terminal 300. FIG. 10 shows a specific example of the state control policy managed by the policy management unit 204B. Examples of the block policy include an IDLE transition request (e.g., request for transition to RRC_IDLE) received from the mobile terminal 300, and an IDLE transition request received from an O&M (Operations & Maintenance) server.

The state control unit 103B of the radio base station has the functions of the state control unit 103 described above with reference to FIG. 4. Further, upon receiving the state control request from the mobility management node 200, the state control unit 103B notifies the block unit 107 of the terminal ID and the block policy within the state control policy contained in the received request.

The block unit 107 of the radio base station 100 blocks a request or an event that triggers transition of the mobile terminal 300 corresponding to the terminal ID to the IDLE state, based on the terminal ID and the block policy which are notified from the state control unit 103B. The "blocking" includes "ignoring" a request or an event that triggers transition to the IDLE state, and also includes inhibiting execution of the IDLE transition process to be carried out according to the request or the event. The block unit 107 is able to block based on the block policy for each mobile terminal 300. Upon receiving a block start request from the state control unit 103B, the block unit 107 starts a block operation.

Figure 11:
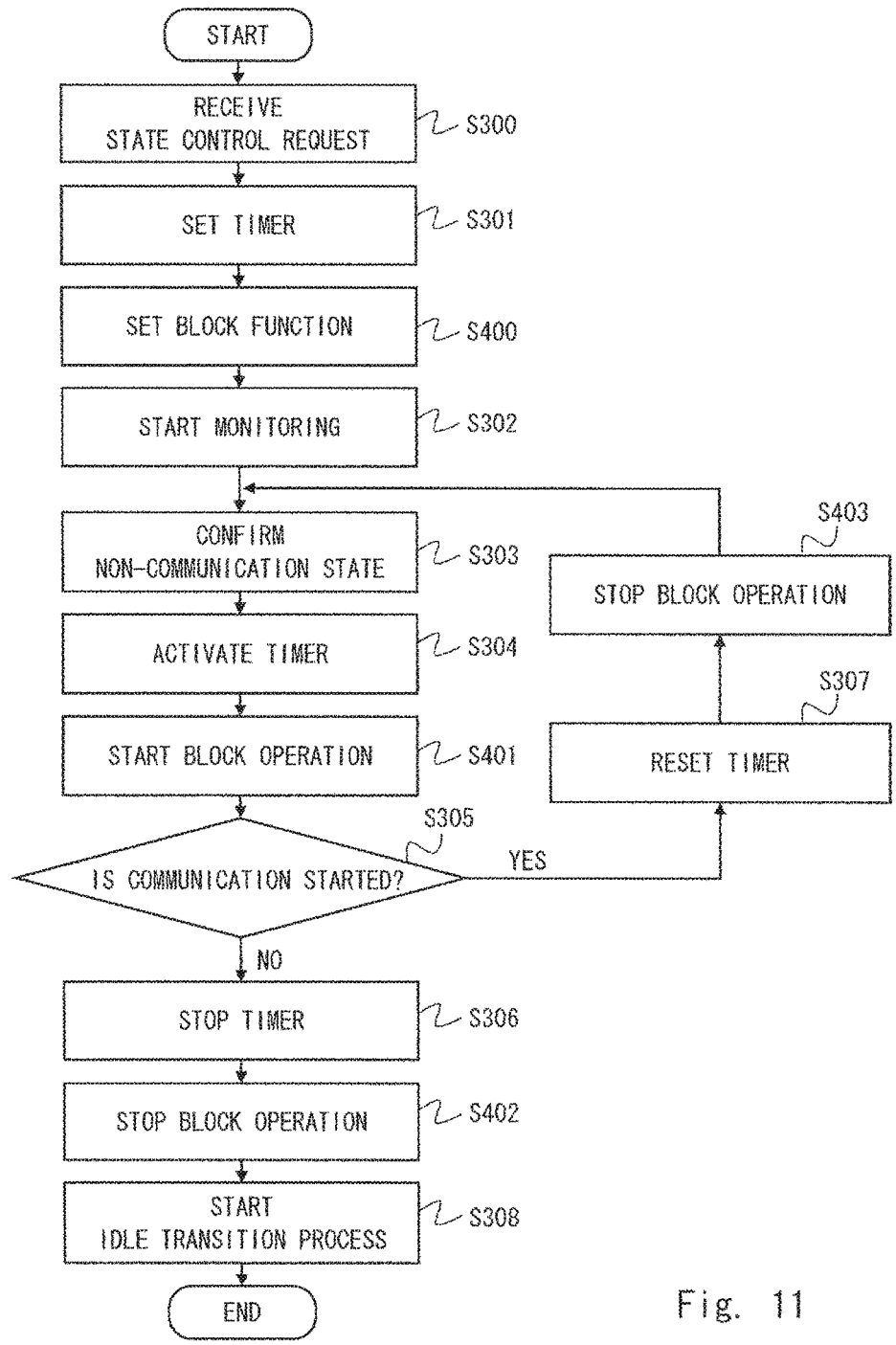
FIG. 11 is a flowchart showing a processing example when the radio base station receives a state control request from the mobility management node in the second embodiment.

Referring next to the flowchart of FIG. 11, the operation of the radio base station 100 of this embodiment will be described. FIG. 11 shows a process example when the radio base station 100 receives the state control request from the mobility management node 200 via the core-side interface 101. Here, steps different from those shown in FIG. 7 described above will be focused and described, and the description of the same steps as those shown in FIG. 7 is omitted.

In step S400, the state control unit 103B acquires the terminal ID and the block policy within the state control policy from the received state control request, and sets the terminal ID and the block policy to the block unit 107.

In step S401, the state control unit 103B notifies the block unit 107 of the block start request and the terminal ID included in the notification received from the monitoring unit 104 in step S303. The block unit 107 starts the block operation for the mobile terminal 300 corresponding to the notified terminal ID based on the block policy set in step S400.

In step S402, upon receiving the notification, which indicates that the configured time is expired and includes the terminal ID, from the timer function unit 105 in step S306, the state control unit 103B sends a block stop request including this terminal ID to the block unit 107. The block unit 107 receives the block stop request, and then stops the block operation for the mobile terminal 300 corresponding to the terminal ID included in the stop request.

In step S403, upon receiving, from the monitoring unit 104, the terminal ID and the notification indicating that the data communication of the mobile terminal 300 of the monitoring target is resumed in step S305, the state control unit 103B sends the block stop request including this terminal ID to the block unit 107. The block unit 107 receives the block stop request, and then stops the block operation for the mobile terminal 300 corresponding to the terminal ID included in the stop request.

According to the specific example described in this embodiment, it is possible to obtain the effect of the specific example described in the first embodiment, and it is also possible to cause the radio base station 100 to perform the operation for blocking a request or an event that triggers transition of the mobile terminal 300 from the CONNECTED state to the IDLE state, based on an instruction from the core network 10 (specifically, the mobility management node 200). For example, a request for transition from the CONNECTED state to the IDLE state, which reaches the radio base station 100 from the mobile terminal 300, can be blocked for a certain period of time.

Third Embodiment

This embodiment illustrates an example in which the core network 10 notifies the radio base station 100 of a policy related to control of a radio resource when the mobile terminal 300 in the CONNECTED state is not performing data communication (hereinafter referred to as "radio control policy"), as well as the state control policy described in the first embodiment.

Figure 12:
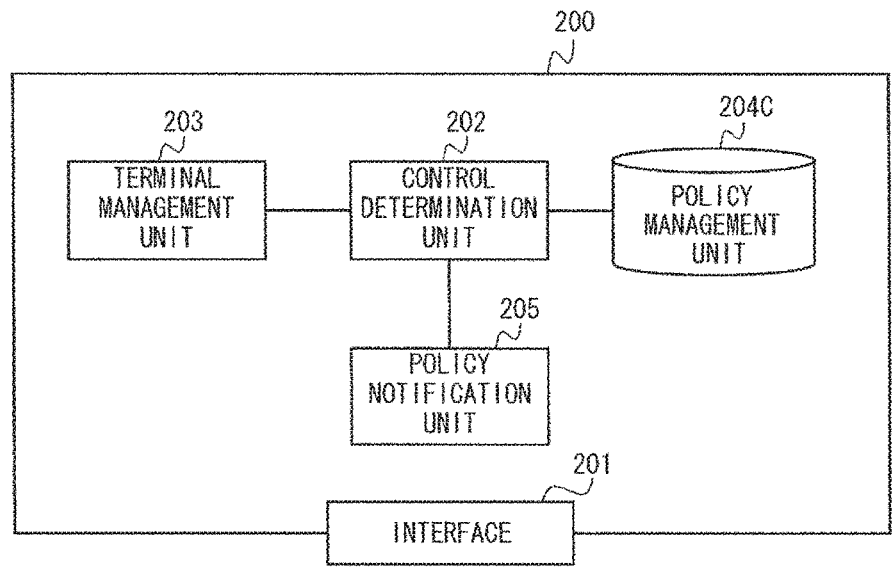
FIG. 12 is a diagram showing a configuration example of a mobility management node in a third embodiment.

FIG. 12 is a block diagram showing a configuration example of the mobility management node 200 in this embodiment. In the example of FIG. 12, parameters included in the state control policy held in a policy management unit 204C are partially different from the parameters of the state control policy held in the policy management unit 204 shown in FIG. 2. The other elements shown in FIG. 12 are similar to the corresponding elements of FIG. 2.

Figure 13:
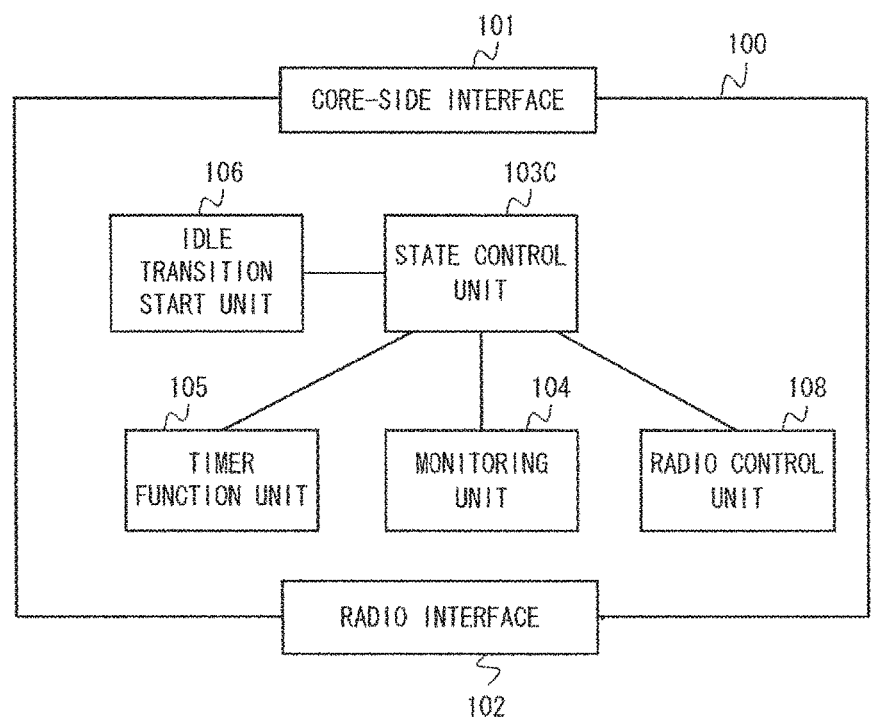
FIG. 13 is a diagram showing a configuration example of a radio base station in the third embodiment.

FIG. 13 is a block diagram showing a configuration example of the radio base station 100 in this embodiment. As compared with the configuration example shown in FIG. 4, a radio control unit 108 is added in the example of FIG. 13. The functions of the state control unit 103C shown in FIG. 13 are partially different from the functions of the state control unit 103 shown in FIG. 4. The other components shown in FIG. 13 are similar to the corresponding elements of FIG. 4.

The policy management unit 204C of the mobility management node 200 stores the above-mentioned "radio control policy", i.e., the policy related to control of a radio resource when the mobile terminal in the CONNECTED state is not performing data communication, as well as the policy for performing control for the CONNECTED-IDLE transition (for example, the IDLE transition interval of the mobile terminal 300, and the block policy). FIG. 14 shows a specific example of the state control policies managed by the policy management unit 204C. In the example of FIG. 14, the radio control policy is added as one of the state control policies. An example of the radio control policy is an interval of discontinuous reception (DRX) of the mobile terminal 300 in the CONNECTED state.

The state control unit 130C of the radio base station 100 has the functions of the state control unit 103 described above with reference to FIG. 4. Further, the state control unit 103C has the function of notifying the radio control unit 108 of the terminal ID included in the request and the radio control policy within the state control policy, upon receiving the state control request from the mobility management node 200.

According to the terminal ID and the radio control policy which are notified from the state control unit 103C, the radio control unit 108 of the radio base station 100 performs the radio resource control (specifically, setting of DRX) of the mobile terminal 300 corresponding to the notified terminal ID. The radio control unit 108 controls the radio resource based on the radio control policy for each mobile terminal 300. The discontinuous reception (DRX) in the case where the mobile terminal 300 is in the CONNECTED state (i.e., RRC_CONNECTED state) can be controlled. For example, it is proposed that the base station 100 configures the discontinuous reception (DRX) while observing an activity of the mobile terminal 300 (Reference: 3GPP TS 36.300 "Evolved Universal Terrestrial Radio Access (E-UTRA) And Evolved Universal Terrestrial Radio Access Network (E-UTRAN); Overall Description").

Figure 15:
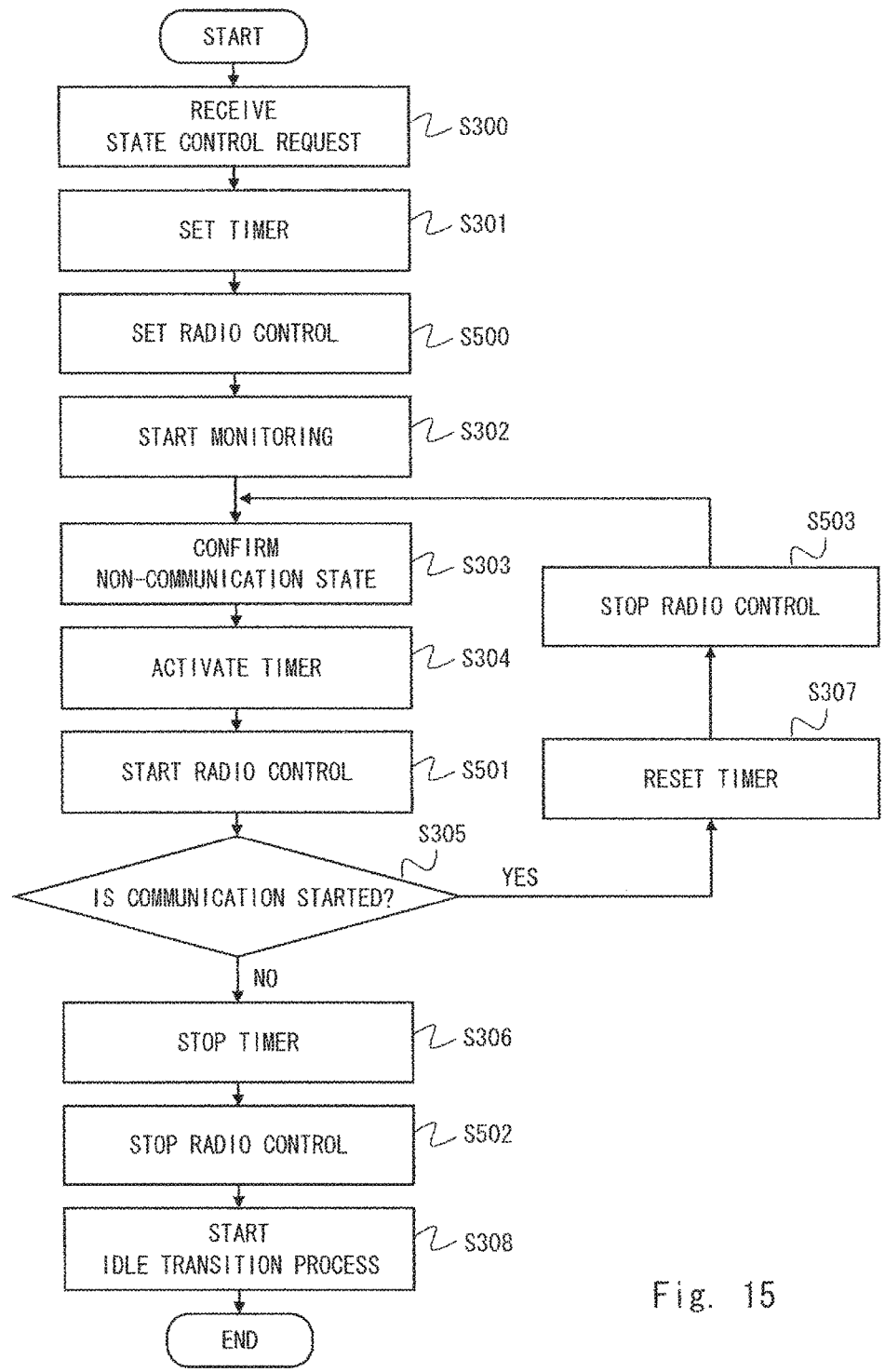
FIG. 15 is a flowchart showing a processing example when the radio base station receives a state control request from the mobility management node in the third embodiment.

Next, the operation of the radio base station 100 of this embodiment will be described with reference to the flowchart of FIG. 15. FIG. 15 shows a process to be carried out when the radio base station 100 receives the state control request from the mobility management node 200 via the core-side interface 101. Here, steps different from those shown in FIG. 7 described above are focused and described, and the description of the same steps as those shown in FIG. 7 is omitted.

In step S500, the state control unit 103C acquires the terminal ID and the radio control policy within the state control policy from the received state control request, and sets the terminal ID and the radio control policy to the radio control unit 108.

In step S501, the state control unit 103C notifies the radio control unit 108 of the radio control start request and the terminal ID included in the notification received from the monitoring unit 104 in step S303. The radio control unit 108 starts the radio control (setting of DRX value) for the mobile terminal 300 corresponding to the notified terminal ID based on the radio control policy (DRX value) configured in step S500.

Next, in step S502, upon receiving the notification, which indicates that the configured time is expired and includes the terminal ID, from the timer function unit 105 in step S306, the state control unit 103C sends a radio control stop request including the terminal ID to the radio control unit 108. The radio control unit 108 receives the radio control stop request, and then stops the radio control for the mobile terminal 300 corresponding to the terminal ID included in the stop request.

Next, in step S503, upon acquiring, from the monitoring unit 104, the terminal ID and the notification indicating that the data communication of the mobile terminal 300 of the monitoring target is resumed in step S305 of the first embodiment, the state control unit 103C sends the radio control stop request including this terminal ID to the radio control unit 108. The radio control unit 108 having received the radio control stop request stops the radio control for the mobile terminal 300 corresponding to the terminal ID included in the stop request. If the DRX is deactivated at the timing of step S503, this process is ignored.

According to the specific example described in this embodiment, it is possible to obtain the effect of the specific example described in the first embodiment, and it is also possible to perform, for the radio base station 100, the setting for handling the radio resource related to the mobile terminal 300 maintained in the CONNECTED state, based on an instruction from the core network 10 (specifically, the mobility management node 200). For example, the interval of the DRX by the mobile terminal 300 in the case where there is no data communication in the CONNECTED state can be configured to the radio base station 100 from the core network 10 for each mobile terminal 300.

Fourth Embodiment

In this embodiment, a specific example of the timing of determining a terminal to be subjected to a state control (i.e., control target terminal) will be described. Specifically, in this embodiment, the control target terminal is determined at the timing when the mobile terminal 300 connects (i.e., cell selection, cell reselection) or performs handover to the radio base station 100 under management of the mobility management node 200.

Figure 16:
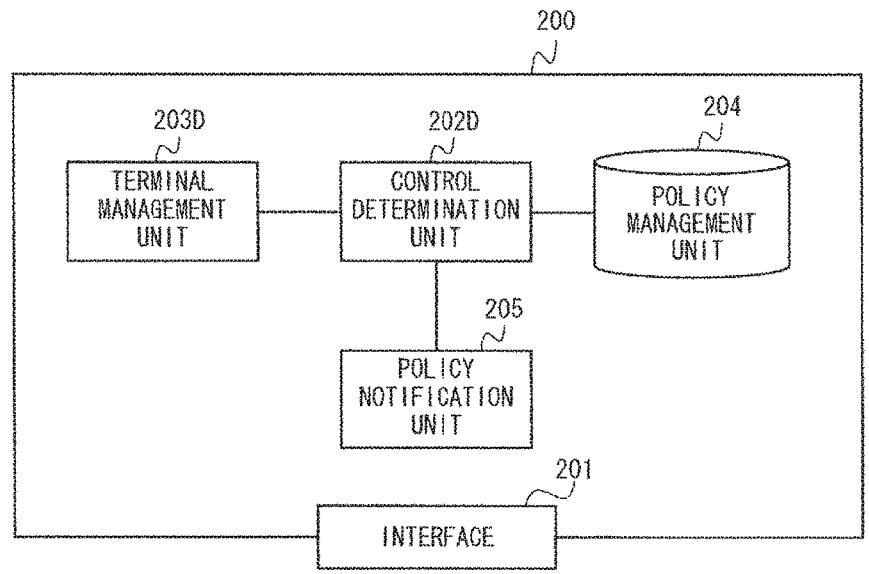
FIG. 16 is a diagram showing a configuration example of a mobility management node in a fourth embodiment.

FIG. 16 is a block diagram showing a configuration example of the mobility management node 200 in this embodiment. In the example of FIG. 16, the functions of a control determination unit 202D and a terminal management unit 203D are partially different from the functions of the control determination unit 202 and the terminal management unit 203 which are described above with reference to FIG. 2. The other elements shown in FIG. 16 are similar to the corresponding elements of FIG. 2.

The terminal management unit 203D of the mobility management node 200 has the functions of the terminal management unit 203 described above with reference to FIG. 2. Further, when the mobile terminal 300 connects (i.e., cell selection, cell reselection) or performs handover to the radio base station 100, the terminal management unit 203D sends, to the control determination unit 202D, a "connection notification" including the terminal ID of the mobile terminal 300 and the base station ID of radio base station 100 to which the mobile terminal 300 is connected.

The control determination unit 202D of the mobility management node 200 has the functions of the control determination unit 202 described above with reference to FIG. 2. Further, upon receiving a connection notification indicating the connection of the mobile terminal 300 from the terminal management unit 203D, the control determination unit 202D confirms whether the new terminal 300 is a control target terminal. Then, when the new terminal 300 is judged as the control target terminal, the control determination unit 202D requests the radio base station 100 to perform the state control of the terminal.

Figure 17:
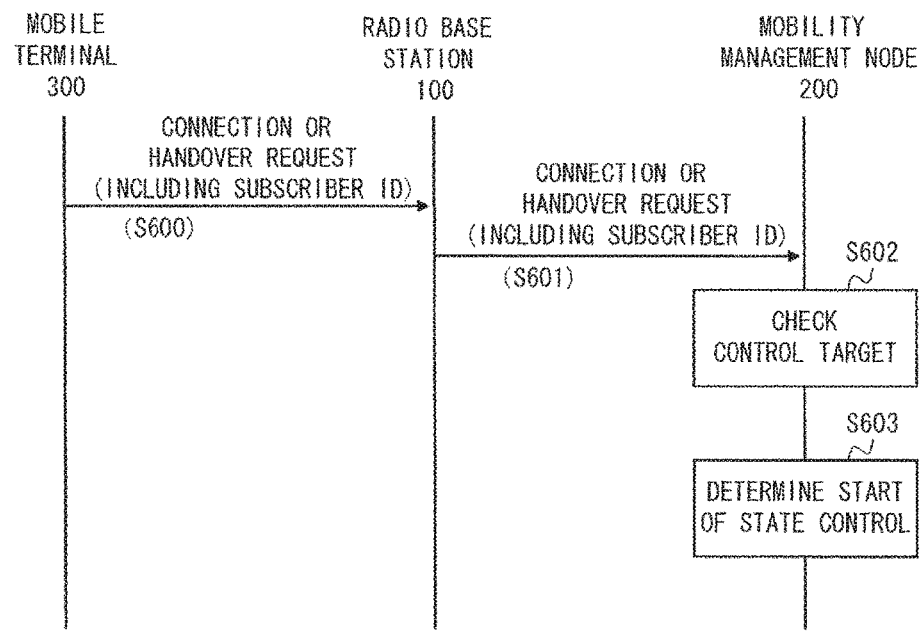
FIG. 17 is a sequence diagram showing a flow of processes to start a state control for a mobile terminal when the mobile terminal starts connection and handover to a radio base station.

Referring next to the sequence diagram of FIG. 17, a description will be made of a flow of processes for starting the state control for the mobile terminal upon being triggered by the connection or hand over to the radio base station 100 of the mobile terminal 300. In step S600, the mobile terminal 300 starts a connection process or a handover process for the radio base station 100. At the time of starting this process, the mobile terminal 300 notifies the radio base station 100 of the terminal ID. Next, in step S601, the radio base station 100 transfers a connection request or a handover request received in step S600 to the mobility management node 200. In step S602, based on the terminal ID contained in the connection request or the handover request received in step S601, the mobility management node 200 checks whether the mobile terminal corresponding to the terminal ID is a control target terminal. That is, the connection request or the handover request sent from the radio base station 100 to the mobility management node 200 corresponds to the "connection notification". In step S603, when the checked mobile terminal is judged as the control target as a result of checking in step S602, the mobility management node 200 determines to start the state control for the mobile terminal. The subsequent procedure may be similar to step S101 and subsequent steps shown in FIG. 5.

Figure 18:
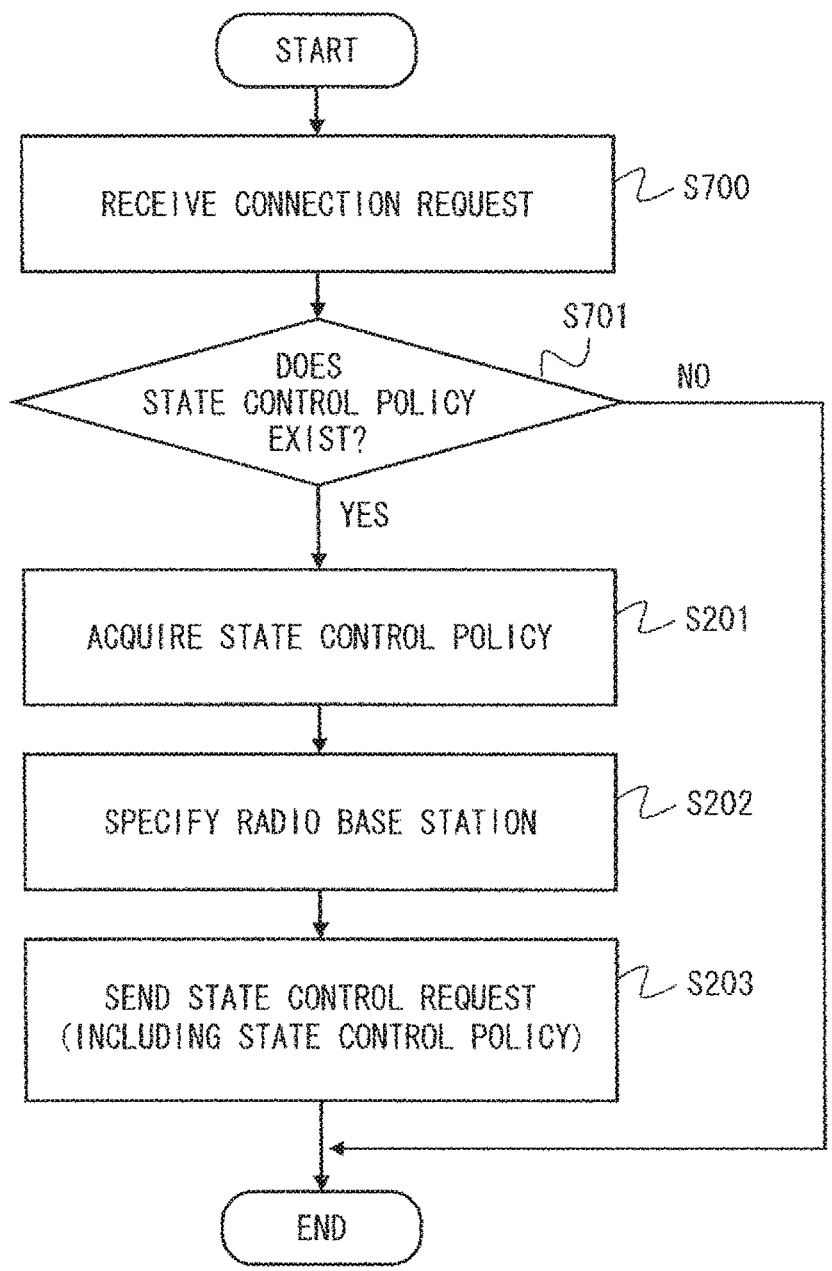
FIG. 18 is a flowchart showing a processing example when the mobility management node receives a connection notification of the mobile terminal from the radio base station in the fourth embodiment.

Referring next to the flowchart of FIG. 18, the operation of the mobility management node 200 of this embodiment will be described. FIG. 18 shows a process to be carried out when the mobility management node 200 receives the connection notification of the mobile terminal from the radio base station 100. Here, steps different from those shown in FIG. 6 described above are focused and described, and the description of the same steps as those shown in FIG. 6 is omitted.

In step S700, the terminal management unit 203D receives from the radio base station 100 the connection notification including the terminal ID of the terminal 300 which is attempting to connect or to perform handover to the radio base station 100, and notifies the control determination unit 202D of the terminal ID. Specific examples of the connection notification include a connection request and a handover request of the mobile terminal 300.

In step S701, the control determination unit 202D confirms whether the state control policy corresponding to the terminal ID acquired in step S700 exists in the policy management unit 204. When the state control policy does not exist, it is judged that the mobile terminal 300 corresponding to the terminal ID is not the control target, and the control process is completed. On the other hand, when the state control policy exists (YES in step S701), the process proceeds to step S201 which is described above with reference to FIG. 6.

According to the specific example described in this embodiment, it is possible to check whether the mobile terminal 300 is a terminal to be subjected to the state control including the control for the CONNECTED-IDLE transition, at the timing when the mobile terminal 300 connects or performs handover to the radio base station 100 under management of the mobility management node 200, thereby making it possible to start the state control if the terminal is the control target terminal.

Fifth Embodiment

In this embodiment, a modification of a specific example of the arrangement of the state control policy described in the first embodiment will be described. Specifically, while FIG. 2 illustrates the configuration in which the mobility management node 200 includes the policy management unit 204, this embodiment illustrates an example in which the policy management unit is arranged outside the mobility management node 200.

Figure 19:
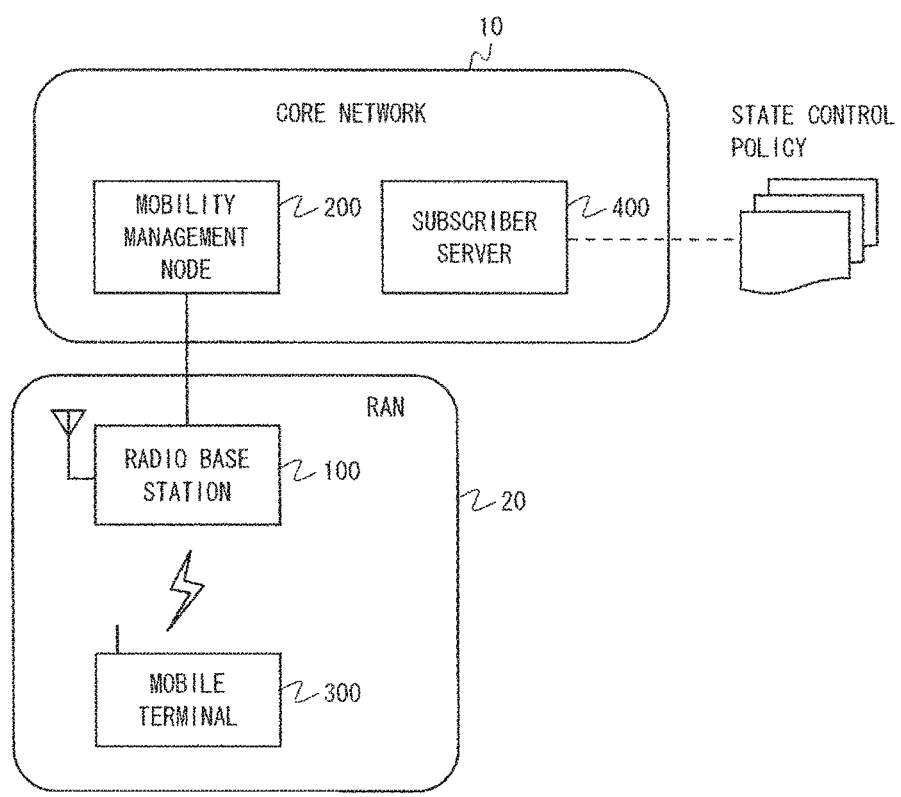
FIG. 19 is a diagram showing a configuration example of a mobile communications system in a fifth embodiment.
Figures 21, 22:
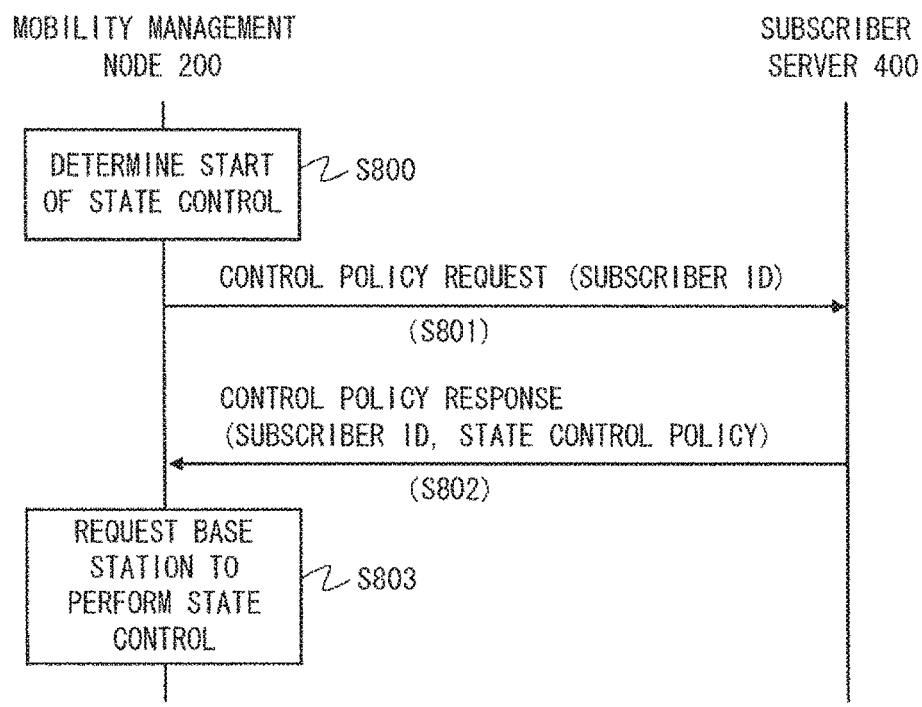
FIG. 21 is a table showing an example of a state control policy in the fifth embodiment.
FIG. 22 is a sequence diagram showing a flow of processes when the mobility management node determines a state control for a specific mobile terminal in the fifth embodiment.

FIG. 19 is a block diagram showing a configuration example of the mobile communications system according to this embodiment. As compared with the example of FIG. 1, a subscriber server 400 is newly added in the example of FIG. 19. The subscriber server 400 manages subscriber information and corresponds to an HSS (Home Subscriber Server) in the 3GPP. The subscriber server 400 of this embodiment is characterized by managing the state control policy for each user. FIG. 21 shows an example of the state control policy managed by the subscriber server 400. In the example of FIG. 21, the state control policy is managed as a piece of information that is managed for each subscriber, by using a subscriber ID for identifying each subscriber as a key.

Figure 20:
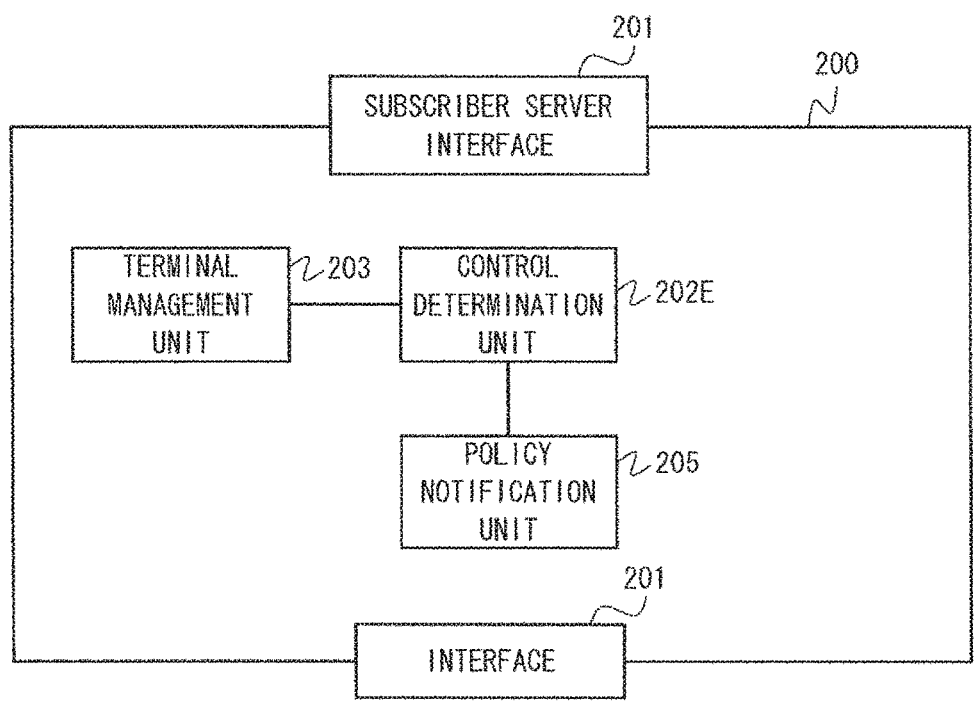
FIG. 20 is a diagram showing a configuration example of a mobility management node in the fifth embodiment.

FIG. 20 is a block diagram showing a configuration example of the mobility management node 200 of this embodiment. In the example of FIG. 20, the policy management unit 204 is omitted from the configuration example shown in FIG. 2 and a subscriber server interface 206 is added. The functions of a control determination unit 202E are partially different from the functions of the control determination unit 202 shown in FIG. 2. The other elements shown in FIG. 20 are similar to the corresponding elements of FIG. 2.

The subscriber server interface 206 of the mobility management node 200 is an interface that enables exchange of the subscriber information, which includes the state control policy, between the mobility management node 200 and the subscriber server 400. The control determination unit 202E of the mobility management node 200 has the functions of the control determination unit 202 described above with reference to FIG. 2. Further, when determining the state control for the mobile terminal 300, the control determination unit 202E sends an inquiry to the subscriber server 400 by using the subscriber ID of the control target terminal, thereby acquiring the state control policy corresponding to the control target terminal.

Referring next to the sequence diagram of FIG. 22, a description will be made of a flow of processes, in the mobile communications system shown in FIG. 19, for acquiring the state control policy corresponding to the control target terminal from the subscriber server 400 when the mobility management node 200 determines the control target terminal to be subjected to the state control. First, in step S800, the mobility management node 200 determines the state control for a certain mobile terminal, and recognizes the subscriber ID of the control target terminal. In step S801, the mobility management node 200 sends, to the subscriber server 400, a control policy request including the subscriber ID of the control target terminal. In step S802, the subscriber server 400 acquires, from the subscriber information managed by the subscriber server 400, the state control policy corresponding to the subscriber ID contained in the control policy request acquired in step S801. Then, the subscriber server 400 returns, to the mobility management node 200, a control policy response including the subscriber ID corresponding to the acquired state control policy. In step S803, the mobility management node 200 sends, to the radio base station 100, the state control request including the state control policy acquired in step S802, thereby requesting the radio base station 100 to perform the state control including the control for the CONNECTED-IDLE transition for the control target terminal. The procedure of step S802 and subsequent steps may be similar to step S101 and subsequent steps shown in FIG. 5.

Figure 23:
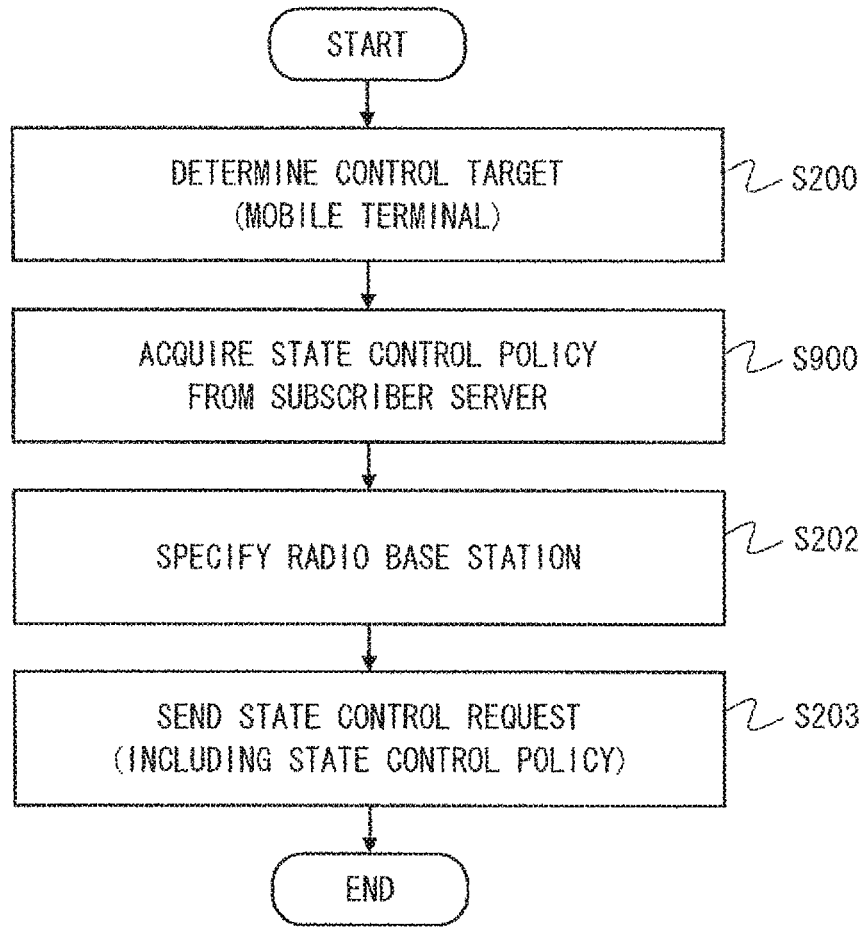
FIG. 23 is a flowchart showing a processing example when the mobility management node starts the state control for the specific mobile terminal in the fifth embodiment.

Referring next to the flowchart of FIG. 23, the operation of the mobility management node 200 of this embodiment will be described. FIG. 23 shows a process to be carried out when the mobility management node 200 starts the state control for the mobile terminal 300. Here, step 900 which is a difference from FIG. 6 described above is focused and described, and the description of steps S200, S202, and S203, which are the same as those of FIG. 6, is omitted. In step S900, the control determination unit 202E sends a request for the state control policy to the subscriber server 400 by using the terminal ID (subscriber ID in this case) of the control target terminal, and acquires the state control policy corresponding to the terminal ID (subscriber ID) from the subscriber server 400.

According to the specific example described in this embodiment, the state control policy related to the control for the CONNECTED-IDLE transition of the mobile terminal are registered as a part of the subscriber information in the subscriber server 400 for each subscriber, thereby enabling the state control for each subscriber.

Sixth Embodiment

In this embodiment, a specific example of the method for determining a terminal to be subjected to a state control (i.e., control target terminal) and a specific example of the method for determining a state control policy will be described. Specifically, in this embodiment, a situation of the mobile terminal 300 is obtained, and the mobile terminal 300 to be subjected to the state control and the state control policy to be applied to the terminal are determined according to the "situation of the mobile terminal 300". The "situation of the mobile terminal 300", which is used to determine the state control policy, is an element for determining a control content related to the CONNECTED-IDLE transition of the mobile terminal 300. Examples of the situation of the mobile terminal 300 include: (1) a communication frequency of the mobile terminal 300; (2) a movement frequency of the mobile terminal 300; (3) an external network (connection destination network) to which the mobile terminal 300 is connected; (4) a time zone (behavior pattern) to which the mobile terminal 300 belongs; (5) a location where the mobile terminal 300 is positioned; (6) an application program currently activated in the mobile terminal 300; (7) a battery remaining amount of the mobile terminal 300; (8) a radio access network (wireless LAN, LTE, WiMAX, etc.) to which the mobile terminal 300 is currently connected; and (9) an arbitrary combination thereof. Since the situation of the mobile terminal 300 as described above is not fixed but varied, the state control policy to be applied is changed according to a change in the situation of the mobile terminal 300 in this embodiment.

Figure 24:
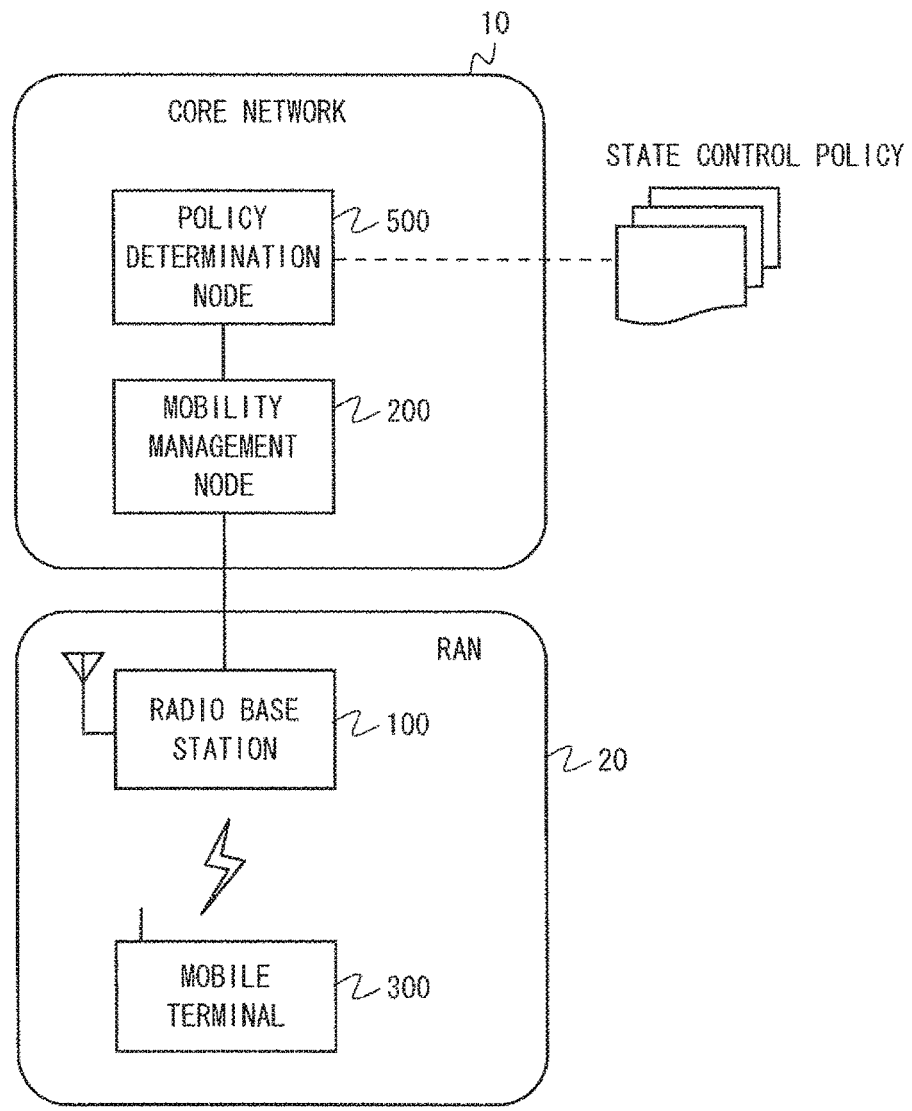
FIG. 24 is a diagram showing a configuration example of a mobile communications system in a sixth embodiment.

FIG. 24 is a block diagram showing a configuration example of the mobile communications system according to this embodiment. As compared with the example of FIG. 1, a policy determination node 500 is newly added in the example of FIG. 24. The policy determination node 500 acquires the situation of the mobile terminal 300 and determines the state control policy to be applied based on the situation of the mobile terminal 300. In the example of FIG. 24, the policy determination node 500 is described as another node which is independent of the mobility management node 200. However, the arrangement of the functions of the policy determination node 500 is appropriately determined based on the design concept of the network architecture. For example, the functions of the policy determination node 500 may be arranged in the mobility management node 200 or the radio base station 100.

Figure 25:
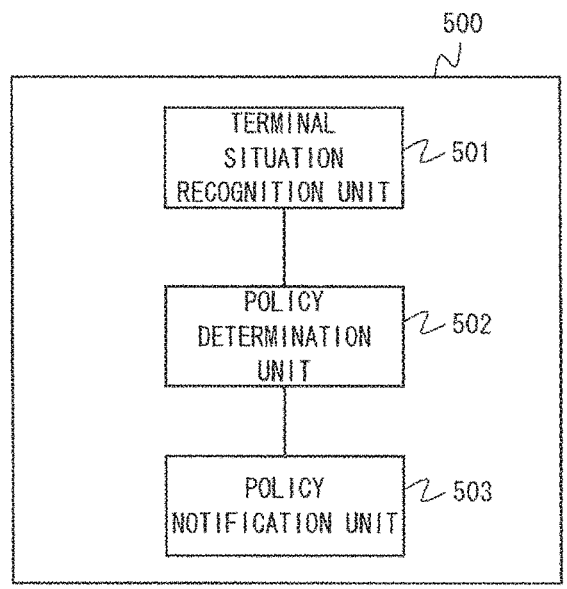
FIG. 25 is a diagram showing a configuration example of a policy determination node in the sixth embodiment.

Next, the configuration of the policy determination node 500 will be described. FIG. 25 is a block diagram showing a configuration example of the policy determination node 500 of this embodiment. The policy determination node 500 shown in FIG. 25 includes a terminal situation recognition unit 501, a policy determination unit 502, and a policy notification unit 503. Note that FIG. 25 shows components in a major portion necessary for explanation of this embodiment, and the illustration of the other portion is omitted.

The terminal situation recognition unit 501 recognizes the situation of the mobile terminal 300 which is used to determine the state control policy to be applied to the mobile terminal 300. The terminal situation recognition unit 501 may recognize the situation of the mobile terminal 300 by monitoring/measuring the mobile terminal 300 by itself, or may recognize the situation of the mobile terminal 300 by acquiring information indicating the situation of the mobile terminal 300 from another node such as the mobility management node 200 or the radio base station 100.

The policy determination unit 502 determines the state control policy to be applied to the mobile terminal 300 according to the situation of the mobile terminal 300 which is acquired by the terminal situation recognition unit 501. The policy determination unit 502 may determine the state control policy to be applied to the mobile terminal 300 by using a rule that defines the correspondence between the situation of the mobile terminal 300 and the state control policy. In the case of using a numerical parameter as the situation of the mobile terminal 300, such as a movement frequency or a communication frequency, the policy determination unit 502 may determine the parameter of the state control policy by performing a calculation using this numerical parameter. As a specific example, the policy determination unit 502 may calculate the value of the IDLE transition interval by using the value of the movement frequency or the communication frequency.

The policy notification unit 503 notifies the mobility management node 200, which manages the mobile terminal 300 to which the state control policy is applied (i.e., the control target terminal), of the state control policy determined by the policy determination unit 502. When the functions of the policy determination node 500 are arranged in the mobility management node 200, the policy notification unit 503 notifies the radio base station 100 of the state control policy determined by the policy determination unit 502.

Figure 26:
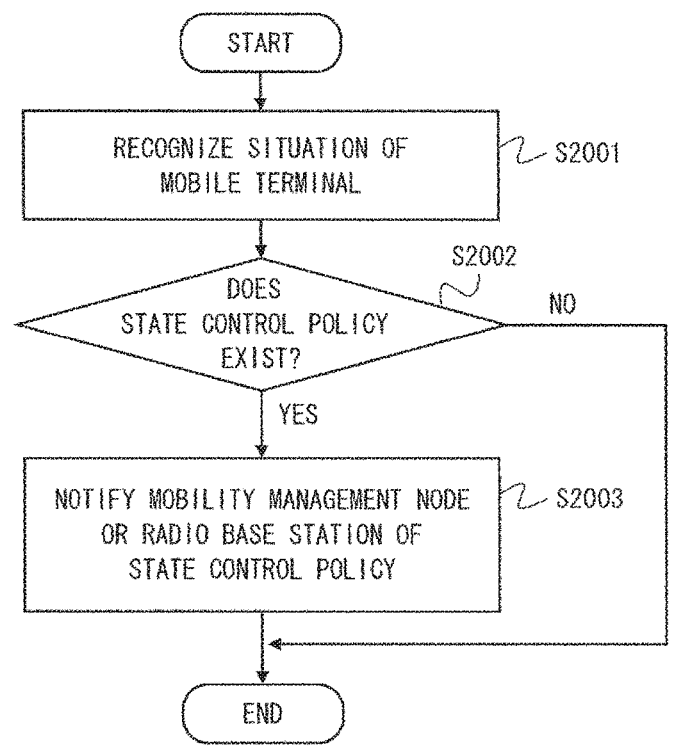
FIG. 26 is a flowchart showing a processing example when the policy determination node determines and notifies the state control policy in a situation of a mobile terminal in the sixth embodiment.

Next, the operation of the policy determination node 500 of this embodiment will be described with reference to the flowchart of FIG. 26. FIG. 26 shows a processing example when the policy determination node 500 recognizes the situation of the mobile terminal 300. In step S2001, the terminal situation recognition unit 501 recognizes the situation of the mobile terminal 300. In step S2002, the policy determination unit 502 determines whether the state control policy corresponding to the situation of the mobile terminal 300 which is acquired in step S2001 exits, based on the rule that defines the correspondence between the situation of the mobile terminal 300 and the state control policy. When the state control policy corresponding to the situation of the mobile terminal 300 which is acquired in step S2001 is not predetermined, the policy determination unit 502 determines "error" or "no need for state control" and aborts the process. In step S2003, the policy notification unit 503 notifies the mobility management node 200 which manages the control target terminal, or the radio base station 100 to which the control target terminal is currently connected, of the state control policy determined in step S2002.

As described above, specific examples of the situation of the mobile terminal 300 which is recognized by the policy determination node 500 include an external network to which the mobile terminal 300 is connected, a movement frequency, a communication frequency, a location of the mobile terminal 300, and a radio access network to which the mobile terminal 300 is currently connected. The method for recognizing the situation of the mobile terminal 300 is different depending on which parameter is used to indicate the situation of the mobile terminal 300. Some specific examples of the method for recognizing the situation of the mobile terminal 300 will be described in detail below.

First Example: Movement Frequency and Communication Frequency of Mobile Terminal In the second example, the policy determination node 500 recognizes the movement frequency and the communication frequency of the mobile terminal 300 as the situation of the mobile terminal 300. The movement frequency of the mobile terminal 300 indicates the number of times of movement of the mobile terminal 300 between radio base stations per unit time. The communication frequency of the mobile terminal 300 indicates the number of times of communication of the mobile terminal 300 per unit time. For example, the terminal situation recognition unit 501 may receive a notification as to detection results of a movement or an initiation of communication of the mobile terminal 300 from a node, such as the mobility management node 200, which is capable of detecting the movement or the initiation of communication of the mobile terminal 300. In this case, the terminal situation recognition unit 501 may count the notifications as to the movement or the initiation of communication of the mobile terminal 300, to thereby calculate the movement frequency and the communication frequency per unit time. Further, the terminal situation recognition unit 501 may receive a notification containing measurement results of the movement frequency and the communication frequency of the mobile terminal 300 per unit time from a node, such as the mobility management node 200, which is capable of detecting the movement and the initiation of communication of the mobile terminal 300.

The policy determination unit 502 determines the state control policy to be applied to the terminal, based on the rule that defines the correspondence between the movement frequency and communication frequency of the mobile terminal 300 and the state control policy. FIG. 27 shows an example of the rule that defines the correspondence between the movement frequency and communication frequency of the mobile terminal 300 and the state control policy. In the example of FIG. 27, the state control policy to be applied to the terminal is switched depending on whether the movement frequency per unit time (for example, 10 minutes or one hour) of the mobile terminal 300 is equal to or more than the communication frequency.

The policy notification unit 503 notifies the mobility management node 200, which manages the mobile terminal 300, of the determined state control policy as well as the identifier of the mobile terminal 300. Note that when the functions of the policy determination node 500 are arranged in the mobility management node 200, the state control for the mobile terminal can be started at the time when the mobility management node 200 measures the movement frequency and the communication frequency of the mobile terminal 300 per unit time.

According to this specific example, the usage circumstances (movement and communication interval) of the mobile terminal 300 are monitored to thereby determine the state control policy so as to reduce the number of signalings to be processed by the core network 10, according to a change in the usage circumstances of the mobile terminal 300. Note that the policy determination node 500 may determine the state control policy such that a transition interval from the CONNECTED state to the IDLE state is relatively longer in the case where the movement frequency of the mobile terminal 300 is equal to or more than the communication frequency, than that in the case where the movement frequency of the mobile terminal 300 is less than the communication frequency.

Second Example: Connection Destination Network of Mobile Terminal

In the first example, the policy determination node 500 recognizes an external network (connection destination network) to which the mobile terminal 300 is connected, as the situation of the mobile terminal 300. In the case of 3GPP, the connection destination network is referred to as PDN (Packet Data Network) and is identified by APN (Access Point Name). The terminal situation recognition unit 501 acquires information (e.g., APN) on the connection destination network of the mobile terminal 300. The terminal situation recognition unit 501 may acquire the information on the connection destination network from the mobility management node 200. The mobility management node 200 acquires the APN as a piece of subscriber information by sending an inquiry to the HSS (Home Subscriber Server), and then performs signaling with packet transfer nodes, such as P-GW (PDN-Gateway) and S-GW (Serving Gateway), so as to establish a connection (bearer) between the mobile terminal 300 and the external network (PDN). Accordingly, the mobility management node 200 recognizes the information (APN) on the connection destination network of the mobile terminal 300 under management. For example, the mobility management node 200 may notify the policy determination node 500 of the information (APN) on the connection destination network upon being triggered by the connection of the mobile terminal 300 to the connection destination network.

The policy determination unit 502 determines the state control policy based on the rule that defines the correspondence between the connection destination network and the state control policy. FIG. 28 shows an example of the rule that defines the correspondence between the connection destination network and the state control policy.

The policy notification unit 503 notifies the mobility management node 200, which manages the mobile terminal 300, of the determined state control policy as well as the identifier of the mobile terminal 300. When the functions of the policy determination node 500 are arranged in the mobility management node 200, the state control for the terminal can be started at the time when the mobility management node 200 recognizes the connection destination network of the mobile terminal 300.

According to this specific example, for example, the utilization characteristics (movement frequency and communication interval) of the mobile terminal 300 can be estimated based on the connection destination network of the mobile terminal 300. This enables determination of the state control policy so as to reduce the number of signalings to be processed by the core network 10, by determining the state control policy according to the connection destination network of the mobile terminal 300, without directly measuring the utilization characteristics of the mobile terminal 300.

For example, in the case of connecting the mobile terminal 300 to a sales management system of a vending machine manufacturer, this mobile terminal 300 is assumed as a terminal that is embedded in a vending machine with a small degree of movement. Accordingly, the policy determination node 500 may determine the state control policy such that the transition interval from the CONNECTED state to the IDLE state is increased according to the values of the movement frequency and the communication interval of vending machines which are observed in advance or determined in advance. Further, in the case of connecting the mobile terminal 300 to a traffic management system of a traffic information management company, this mobile terminal 300 is assumed as a terminal that is embedded in an automobile, a two-wheel vehicle, or the like with a large degree of movement. Accordingly, the policy determination node 500 may determine the state control policy such that the transition interval from the CONNECTED state to the state is shortened according to the values of the movement frequency and the communication interval of automobiles, two-wheel vehicles, or the like which are observed in advance or determined in advance.

Third Example: Time Zone (Behavior Pattern) of Mobile Terminal

In the third example, the policy determination node 500 recognizes a time zone of the mobile terminal 300 as the situation of the mobile terminal 300. The terminal state recognition unit 501 may check the time as needed, and may detect a change from a first time zone (first behavior pattern) to a second time zone (second behavior pattern), the first time zone and the second time zone being pre-defined for the mobile terminal 300.

Figures 29, 30:
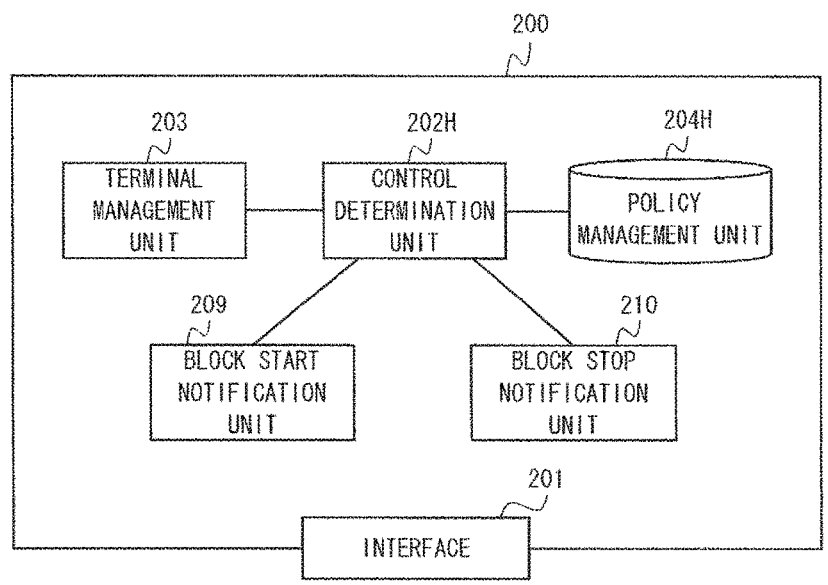
FIG. 29 is a table showing a third example of a rule that defines a relationship between situations of mobile terminal and state control policies in the sixth embodiment.
FIG. 30 is a diagram showing a configuration example of a mobility management node in a seventh embodiment.

The policy determination unit 502 determines the state control policy to be applied to the terminal, based on the rule that defines the correspondence between a plurality of time zones, which are pre-defined for the mobile terminal 300, and the state control policies. FIG. 30 shows an example of the rule that defines the correspondence between the plurality of time zones, which are pre-defined for the mobile terminal 300, and the state control policies. In the example of FIG. 30, a plurality of time zones is defined for the mobile terminal 300 (e.g., terminal A, terminal B) or a terminal group (e.g., group C) including at least one mobile terminal 300. As for the terminal A, for example, the state control policy is switched between the first time period from 8 o'clock to 19 o'clock (i.e., daytime) and the second time zone from 19 o'clock to 8 o'clock (i.e., nighttime).

The policy notification unit 503 notifies the mobility management node 200, which manages the mobile terminal 300, of the determined state control policy as well as the identifier of the mobile terminal 300. When the functions of the policy determination node 500 are arranged in the mobility management node 200, the state control for the terminal can be started at the time when the first time zone (first behavior pattern) leaves and the second time zone (second behavior pattern) comes.

According to this specific example, the utilization characteristics (movement frequency and communication interval) of the mobile terminal 300 can be estimated based on the behavior pattern of the user of the mobile terminal 300. This enables determination of the state control policy so as to reduce the number of signalings to be processed by the core network 10, by determining the state control policy according to the time zone in which the behavior pattern of the user is different, without directly measuring the utilization characteristics of the mobile terminal 300. During the nighttime, for example, it is estimated that the user sleeps and does not move. Accordingly, the policy determination node 500 may determine the state control policy such that the transition interval from the CONNECTED state to the IDLE state of the mobile terminal 300 is relatively longer in the nighttime than that in the daytime.

Fourth Example: Location Where Mobile Terminal is Positioned

The terminal situation recognition unit 501 of the policy determination node 500 recognizes a location where the mobile terminal 300 is positioned, as the situation of the mobile terminal 300. The policy determination unit 502 determines the state control policy to be applied to the mobile terminal, based on the rule that defines the correspondence between the state control policy and the location where the mobile terminal 300 is positioned.

According to this specific example, the utilization characteristics (movement frequency and communication interval) of the mobile terminal 300 can be estimated based on the location where the mobile terminal 300 exists. This enables determination of the state control policy so as to reduce the number of signalings to be processed by the core network 10, by determining the state control policy according to the location of the mobile terminal 300, without directly measuring the utilization characteristics of the mobile terminal 300. For example, when the mobile terminal 300 is located in the home of the user of the mobile terminal 300, it is estimated that the mobile terminal 300 is less likely to move. Accordingly, the policy determination node 500 may determine the state control policy such that the transition interval from the CONNECTED state to the IDLE state is relatively longer when the mobile terminal is located in the home of the user of the mobile terminal 300, than that when the mobile terminal 300 is not located in the home.

Fifth Example: Application Program Activated by Mobile Terminal

The terminal situation recognition unit 501 of the policy determination node 500 recognizes an application program currently activated in the mobile terminal 300, as the situation of the mobile terminal 300. The policy determination unit 502 determines the state control policy to be applied to the terminal, based on the rule that defines the correspondence between the application program activated in the mobile terminal 300 and the state control policy.

According to this specific example, the utilization characteristics (movement frequency and communication interval) of the mobile terminal 300 can be estimated based on the application program currently activated in the mobile terminal 300. This enables determination of the state control policy so as to reduce the number of signalings to be processed by the core network 10, by determining the state control policy according to the application program currently activated in the mobile terminal 300, without directly measuring the utilization characteristics of the mobile terminal 300. For example, when an application program for establishing communication with a mobile terminal once every three minutes is activated, it is estimated that the communication frequency of the mobile terminal 300 is high. Accordingly, the policy determination node 500 may determine the state control policy such that the transition interval from the CONNECTED state to the IDLE state is relatively longer than that when this application program is not activated.

Six Example: Battery Remaining Amount of Mobile Terminal

The terminal situation recognition unit 501 of the policy determination node 500 recognizes a battery remaining amount of the mobile terminal 300 as the situation of the mobile terminal 300. The policy determination unit 502 determines the state control policy to be applied to the terminal, based on the rule that defines the correspondence between the battery remaining amount of the mobile terminal 300 and the state control policy. Alternatively, the policy determination unit 502 may determine the IDLE transition interval, which is included in the state control policy, by performing a calculation using the value of the battery remaining amount.

Seventh Example: Radio Access Network to which Mobile Terminal is Connected

The terminal status recognition unit 501 of the policy determination node 500 recognizes a radio access network to which the mobile terminal 300 is connected, as the status of the mobile terminal 300. The policy determination unit 502 determines the state control policy to be applied to the terminal, based on the rule that defines the correspondence between the state control policy and the radio access network (wireless LAN, LTE, WiMAX, etc.) to which the mobile terminal 300 is connected.

According to this specific example, the utilization characteristics (movement frequency and communication interval) of the mobile terminal 300 can be estimated based on the type of the radio access network used by the mobile terminal 300. This enables determination of the state control policy so as to reduce the number of signalings to be processed by the core network 10, by determining the state control policy according to the radio access network used by the mobile terminal 300, without directly measuring the utilization characteristics of the mobile terminal 300. For example, when the mobile terminal 300 is connected to a wireless LAN service of a hotel, it is estimated that the terminal is less likely to move. Accordingly, in this case, the policy determination node 500 may determine the state control policy such that the transition interval from the CONNECTED state to the IDLE state is relatively longer than that when the mobile terminal 300 is connected to a macrocell base station of a cellular phone carrier.

According to the specific examples described in this embodiment, the individual state control policies are prepared for a plurality of situations of the mobile terminal 300, and the situation of the mobile terminal 300 is monitored, which enables switching of the state control policy to be applied according to the situation of the mobile terminal 300. This makes it possible to control the CONNECTED-IDLE transition according to the situation of the mobile terminal 300.

Seventh Embodiment

In this embodiment, a modification of a specific example (that is, IDLE transition interval) of parameters designated by the state control policies described in the first embodiment will be described. Specifically, in this embodiment, instead of the IDLE transition interval of the mobile terminal 300, a policy for blocking a request or an event that triggers transition of the mobile terminal 300 from the CONNECTED state to the IDLE state is used as a parameter of the state control policy.

FIG. 30 is a block diagram showing a configuration example of the mobility management node 200 in this embodiment. In the example of FIG. 30, the functions of a control determination unit 202H are partially different from the functions of the policy management unit 204 shown in FIG. 2. The types of policies recorded in a policy management unit 204H are partially different from those of the policy management unit 204 shown in FIG. 2. In the example of FIG. 30, a block start notification unit 209 is added instead of the policy notification unit 205, and a block stop notification unit 210 is also added. The other elements shown in FIG. 30 are similar to the corresponding elements of FIG. 2.

Figures 31, 32:
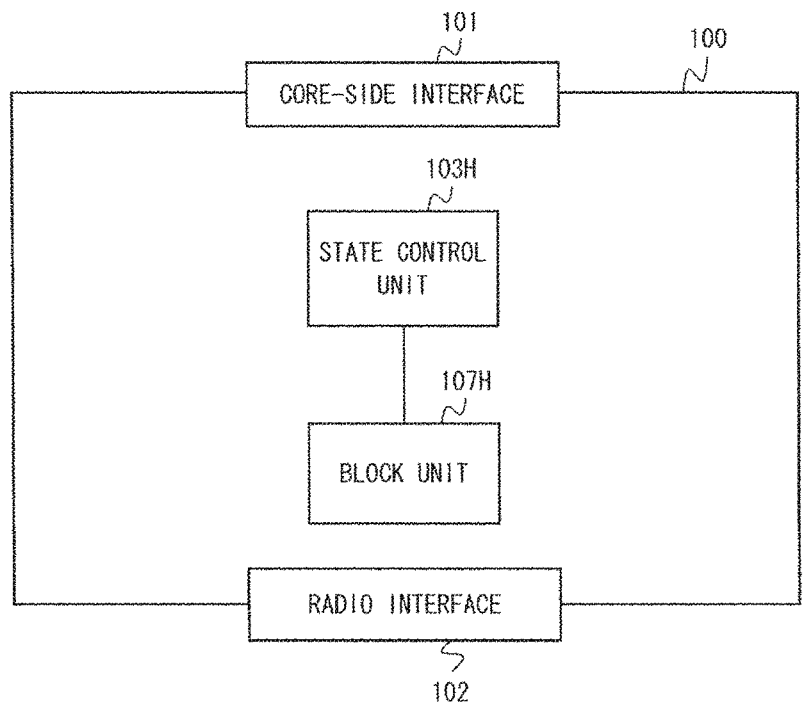
FIG. 31 is a diagram showing a configuration example of a radio base station in the seventh embodiment.
FIG. 32 is a table showing an example of a state control policy in the seventh embodiment.

FIG. 31 is a block diagram showing a configuration example of the radio base station 100 in this embodiment. As compared with the example of FIG. 4, the monitoring unit 104, the timer function unit 105, and the IDLE transition start unit 106 are omitted and a block unit 107H is added in the example of FIG. 31. The functions of a state control unit 103H are partially different from the functions of the state control unit 103 described above with reference to FIG. 4. The other elements shown in FIG. 31 are similar to the corresponding elements of FIG. 4.

The policy management unit 204H of the mobility management node 200 manages the block policy for each mobile terminal 300. As described in the second embodiment of the invention, the block policy is a policy for blocking a request or an event that triggers transition of the mobile terminal 300 from the CONNECTED state to the IDLE state. FIG. 32 shows a specific example of the state control policies of this embodiment which are managed by the policy management unit 204B. In the example of FIG. 32, the terminal ID of the control target terminal is configured as a primary key, and the block policy corresponding to the primary key is managed.

The control determination unit 202H determines the mobile terminal 300 on which the block control is imposed from among the mobile terminals 300 connected to the radio base station 100 under management of the mobility management node 200, acquires the control policy corresponding to the control target terminal from the policy management unit 204H, and notifies the block start notification unit 209 of the terminal ID of the block start target terminal and the control policy to be applied. Further, the control determination unit 202H determines the mobile terminal 300 on which the block control is stopped, and notifies the block stop notification unit 210 of the terminal ID of the mobile terminal 300 on which the block control is stopped.

Upon acquiring, from the control determination unit 202H, the terminal ID of the block start target terminal and the state control policy to be applied, the block start notification unit 209 sends the block start request including the terminal ID and the state control policy to the radio base station 100.

Upon acquiring the terminal ID of the block stop target terminal from the control determination unit 202H, the block stop notification unit 210 sends the block stop request including the terminal ID to the radio base station 100.

Upon receiving the block start request from the mobility management node 200, the state control unit 103H of the radio base station 100 notifies the block unit 107H of the terminal ID included in the start request and the block policy within the state control policy contained in the start request, as the block start request. Further, upon receiving the block stop request from the mobility management node 200, the state control unit 103H notifies the block unit 107H of the terminal ID contained in the received stop request, as the block stop request.

The block unit 107H of the radio base station 100 has the functions similar to those of the block unit 107 described above with reference to FIG. 9. Specifically, when the block start request is received from the state control unit 103H, the block unit 107H starts blocking based on the terminal ID and the block policy contained in the start request. Further, upon acquiring the block stop request from the state control unit 103H, the block unit 107H stops blocking with respect to the terminal ID contained in the stop request.

According to the specific example described in this embodiment, it is possible to cause the radio base station 100 to perform the operation for blocking a request or an event that triggers transition of the mobile terminal 300 from the CONNECTED state to the IDLE state, based on an instruction from the core network 10 (specifically, the mobility management node 200). In other words, according to the specific example described in this embodiment, it is possible for the core network 10 to proactively control the timing of the CONNECTED-IDLE transition in the mobile terminal 300 based on the determination by the core network 10 the mobility management node 200). Accordingly, the number of signalings which are caused due to repetition of the CONNECTED-IDLE transition of the mobile terminal 300 and which are to be processed by the core network 10 can be reduced based on the determination by the core network 10.

Other Embodiment

Any combination of the specific examples described in the first to seventh embodiments of the invention may be implemented.

The function of the mobility management node 200 serving as "policy supply system" described in the first to seventh embodiments, i.e., "the function for supplying the radio access network 20 with the state control policy related to the CONNECTED-IDLE transition of the mobile terminal 300" may be arranged in another node that is arranged in the core network 10 and is different from the mobility management node. Further, the function of the mobility management node 200 serving as "policy supply system" described in the first to seventh embodiments may be arranged in a manner distributed to a plurality of nodes in the core network 10. In other words, the arrangement of the function of the mobility management node 200 serving as "policy supply system" described in the first to seventh embodiments is appropriately determined based on the design concept of the network architecture. As a specific example, in the case of applying the first to seventh embodiments to the UMTS in the 3GPP, the function of the above-mentioned mobility management node 200 serving as "policy supply system" may be arranged in the GGSN (Gateway GPRS Support Node). Furthermore, the function of the mobility management node 200 described in the first to seventh embodiments may be arranged in the O&M (Operations & Maintenance) server.

The function of the radio base station 100 serving as "a control apparatus that performs the state control related to the CONNECTED-IDLE transition of the mobile terminal 300" described in the first to seventh embodiments may be arranged in another node that is different from the radio base station 100. Specifically, the function may be arranged in a node that is arranged in the radio access network 20 and has a radio resource management function. As a specific example, in the case of applying the first to seventh embodiments to the UMTS in the 3GPP, the function of the above-mentioned radio base station 100 may be implemented not by the NB (NodeB), but by a modification of scheduling function and radio bearer management function of the RNC (Radio Network Controller). In the case of applying this embodiment to a communication system of the WiMAX Forum, the operation of the radio base station 100 described above may be implemented not by the BS (Base Station), but by a modification of the functions of the ASN-GW (Access Service Network Gateway).

The first to seventh embodiments illustrate an example in which the state control policy is supplied from the core network 10 (typically, the mobility management node 200 or the policy determination node 500) to the radio base station 100, and the radio base station 100 performs control for the CONNECTED-IDLE transition of the mobile 300 based on the state control policy. However, the state control policy determined by the core network 10 may be supplied to the mobile terminal 300 from the core network 10. In this case, the mobile terminal 300 may autonomously control the CONNECTED-IDLE transition of itself according to the state control policy received from the core network 10. That is, the function of the radio base station 100 serving as "a control apparatus that performs a state control related to the CONNECTED-IDLE transition of the mobile terminal 300" described in the first to seventh embodiments may be arranged in the mobile terminal 300 itself. Also such modifications make it possible to reduce the number of signalings, which are caused due to repetition of the state transition (CONNECTED-IDLE transition) of the mobile terminal and are to be processed by the core network, based on the determination by the core network.

The process for requesting the state control to the radio base station 100 by the mobility management node 200 and the process for controlling the CONNECTED-IDLE transition of the mobile terminal 300 based on the state control policy from the mobility management node 200 by the radio base station 100, which are described in the first to seventh embodiments, may be implemented using a semiconductor processing device such as an ASIC (Application Specific Integrated Circuit) or a DSP (Digital Signal Processor). These processes may also be implemented by causing a computer, such as a microprocessor, to execute a program. Specifically, a program including instructions for causing a computer to execute an algorithm shown in at least one of FIGS. 6, 7, 11, 15, 18, 23, and 26 may be prepared and supplied to a computer.

This program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a radio communication line.

In addition, the present invention is not limited to the above-described embodiments, and various modifications can be made without departing from the scope of the present invention described above.

This application is based upon and claims the benefit of priority from Japanese patent application No. 2011-000991, filed on Jan. 6, 2011, the disclosure of which is incorporated herein in its entirety by reference.

REFERENCE SIGNS LIST

10 CORE NETWORK
20 RADIO ACCESS NETWORK (RADIO ACCESS NETWORK: RAN)
100 RADIO BASE STATION
101 CORE-SIDE INTERFACE
102 RADIO INTERFACE
103 STATE CONTROL UNIT
104 MONITORING UNIT
105 TIMER FUNCTION
106 IDLE TRANSITION START UNIT
103B STATE CONTROL UNIT IN SECOND EMBODIMENT
107 BLOCK UNIT IN SECOND EMBODIMENT
113C STATE CONTROL UNIT IN THIRD EMBODIMENT
108 RADIO CONTROL UNIT IN THIRD EMBODIMENT
103H STATE CONTROL UNIT IN SEVENTH EMBODIMENT
107H BLOCK UNIT IN SEVENTH EMBODIMENT
200 MOBILITY MANAGEMENT NODE
201 INTERFACE
202 CONTROL DETERMINATION UNIT
203 TERMINAL MANAGEMENT UNIT
204 POLICY MANAGEMENT UNIT
205 POLICY NOTIFICATION UNIT
204B POLICY MANAGEMENT UNIT IN SECOND EMBODIMENT
204C POLICY MANAGEMENT UNIT IN THIRD EMBODIMENT
202D CONTROL DETERMINATION UNIT IN FOURTH EMBODIMENT
203D TERMINAL MANAGEMENT UNIT IN FOURTH EMBODIMENT
204C CONTROL DETERMINATION UNIT IN FIFTH EMBODIMENT
206 SUBSCRIBER SERVER INTERFACE IN FIFTH EMBODIMENT
209 BLOCK START NOTIFICATION UNIT IN SEVENTH EMBODIMENT
210 BLOCK STOP NOTIFICATION UNIT IN SEVENTH EMBODIMENT
300 MOBILE TERMINAL
400 SUBSCRIBER SERVER
500 POLICY DETERMINATION NODE
501 TERMINAL SITUATION RECOGNITION UNIT
502 POLICY DETERMINATION UNIT
503 POLICY NOTIFICATION UNIT

The invention claimed is:

1. A mobility management node comprising:
at least one memory storing instructions; and
at least one processor configured to execute the instructions to:
determine a parameter which indicates a time interval based on information about a behavior of a mobile terminal; and
notify a radio base station of the parameter, the radio base station being configured to perform control related to state transition of the mobile terminal using the parameter,
wherein the mobility management node is arranged in a core network.

2. The mobility management node according to claim 1, wherein the parameter is used by the radio base station to reduce state transitions of the mobile terminal between a CONNECTED state and an IDLE state.

3. The mobility management node according to claim 1, wherein the radio base station is configured to reduce state transitions of the mobile terminal between a CONNECTED state and an IDLE state.

4. The mobility management node according to claim 1, wherein the at least one processor is configured to execute the instructions to notify the radio base station of the parameter during setup of S1 signaling connection.

5. The mobility management node according to claim 1, wherein the parameter relates to the state transition of the mobile terminal between ECM-CONNECTED and ECM-IDLE states.

6. The mobility management node according to claim 1, wherein the parameter is determined based on subscription information.

7. The mobility management node according to claim 1, wherein the parameter relates to state transition of the mobile terminal in which the state from a CONNECTED state to an IDLE state is changed by an S1 release procedure.

8. The mobility management node according to claim 1, wherein the parameter relates to state transition of the mobile terminal in which the state from an IDLE state to a CONNECTED state is changed by a Service Request message.

9. The mobility management node according to claim 1, wherein the parameter relates to state transition of the mobile terminal in which the state from a CONNECTED state to an IDLE state is changed by a procedure in which a message is sent by the mobility management node.

10. The mobility management node according to claim 1, wherein the parameter relates to state transition of the mobile terminal in which the state from an IDLE state to a CONNECTED state is caused by a procedure in which a message is sent between the mobile terminal and the mobility management node.

11. A radio base station comprising:
at least one memory storing instructions; and
at least one processor configured to execute the instructions to:
communicate with a mobility management node which is arranged in a core network; and
perform control related to state transition of a mobile terminal using a parameter which indicates a time interval, notified by the mobility management node,
wherein the parameter is determined by the mobility management node based on information about a behavior of the mobile terminal.

12. The radio base station according to claim 11, wherein the at least one processor is configured to execute the instructions to use the parameter to reduce state transitions of the mobile terminal between a CONNECTED state and an IDLE state.

13. The radio base station according to claim 11, wherein the parameter is notified by the mobility management node during setup of S1 signaling connection.

14. The radio base station according to claim 11, wherein the parameter relates to state transition of the mobile terminal between ECM-CONNECTED and ECM-IDLE states.

15. The radio base station according to claim 11, wherein the parameter is determined based on subscription information.

16. The radio base station according to claim 11, wherein the parameter relates to state transition of the mobile terminal in which the state from a CONNECTED state to an IDLE state is changed by an S1 release procedure.

17. The radio base station according to claim 11, wherein the parameter relates to state transition of the mobile terminal in which the state from an IDLE state to a CONNECTED state is changed by a Service Request message.

18. The radio base station according to claim 11, wherein the parameter relates to state transition of the mobile terminal in which the state from a CONNECTED state to an IDLE state is changed by a procedure in which a message is sent by the mobility management node.

19. The radio base station according to claim 11, wherein the parameter relates to state transition of the mobile terminal in which the state from an IDLE state to a CONNECTED state is caused by a procedure in which a message is sent between the mobile terminal and the mobility management node.

20. A mobile terminal comprising:
   at least one memory storing instructions; and
   at least one processor configured to execute the instructions to:
      communicate with a radio base station; and
      be controlled of a state transition by the radio base station using a parameter which indicates a time interval, notified by the mobility management node to the radio base station,
   wherein the parameter is determined by the mobility management node based on information about a behavior of the mobile terminal.

* * * * *

UNITED STATES PATENT AND TRADEMARK OFFICE
CERTIFICATE OF CORRECTION

PATENT NO. : 10,264,620 B2
APPLICATION NO. : 15/865718
DATED : April 16, 2019
INVENTOR(S) : Takanori Iwai Page 1 of 1

It is certified that error appears in the above-identified patent and that said Letters Patent is hereby corrected as shown below:

In the Specification

Column 1, Background Art, Line 66; Delete "3GGP," and insert --3GGP2,-- therefor Column 4, Citation List, Line 13; Delete "V9, 1.0" and insert --V9.1.0-- therefor Column 5, Summary of Invention, Line 21; Delete "red icing," and insert --reducing,-- therefor Column 7, Description of Embodiments, Line 46; Delete "TOO," and insert --100,-- therefor Column 9, Description of Embodiments, Line 12; Delete "(Globally." and insert --(Globally-- therefor Column 10, Description of Embodiments, Line 29; After "terminal", insert --ID.--

Column 13, Description of Embodiments, Line 31; After "station", insert --100--

Column 23, Description of Embodiments, Line 14; After "the", insert --IDLE--

Column 25, Description of Embodiments, Line 41; Delete "macrocell" and insert --microcell-- therefor Column 27, Description of Embodiments, Line 16; After "10", insert --(i. e.,--

Signed and Sealed this
Twentieth Day of August, 2019

Andrei Iancu
*Director of the United States Patent and Trademark Office*